(12) United States Patent
Shimazu et al.

(10) Patent No.: US 9,950,886 B2
(45) Date of Patent: Apr. 24, 2018

(54) SHEET CONVEYING DEVICE, IMAGE READING DEVICE INCORPORATING THE SHEET CONVEYING DEVICE, AND IMAGE FORMING APPARATUS INCORPORATING THE SHEET CONVEYING DEVICE

(71) Applicants: Takehisa Shimazu, Kanagawa (JP); Takeshi Akai, Kanagawa (JP); Keisuke Sugiyama, Kangawa (JP); Takaya Ochiai, Kangawa (JP)

(72) Inventors: Takehisa Shimazu, Kanagawa (JP); Takeshi Akai, Kanagawa (JP); Keisuke Sugiyama, Kangawa (JP); Takaya Ochiai, Kangawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/441,358

(22) Filed: Feb. 24, 2017

(65) Prior Publication Data

US 2017/0260015 A1 Sep. 14, 2017

(30) Foreign Application Priority Data

Mar. 14, 2016 (JP) .................................. 2016-049564

(51) Int. Cl.
| | | |
|---|---|---|
| *B65H 5/00* | (2006.01) | |
| *B65H 5/36* | (2006.01) | |
| *G03G 15/00* | (2006.01) | |

(52) U.S. Cl.
CPC ........... *B65H 5/36* (2013.01); *G03G 15/6529* (2013.01); *B65H 2404/7414* (2013.01);

(Continued)

(58) Field of Classification Search
None
See application file for complete search history.

(56) References Cited

U.S. PATENT DOCUMENTS

| | | | |
|---|---|---|---|
| 2008/0203649 A1* | 8/2008 | Watase ..................... | B65H 3/44 271/9.13 |
| 2009/0026691 A1* | 1/2009 | Ishikawa ................ | B65H 5/062 271/10.12 |

(Continued)

FOREIGN PATENT DOCUMENTS

| | | |
|---|---|---|
| JP | 2009-040565 | 2/2009 |
| JP | 2015-137142 | 7/2015 |

*Primary Examiner* — Prasad V Gokhale
(74) *Attorney, Agent, or Firm* — Harness, Dickey & Pierce, P.L.C.

(57) ABSTRACT

A sheet conveying device, which is included in an image reading device and an image forming apparatus, includes a passage forming body and a sound absorber. The passage forming body is configured to define a sheet conveying passage through which a sheet passes. The sound absorber includes a hollow portion and a communication portion configured to communication the hollow portion and the sheet conveying passage. A position of the communication portion of the sound absorber is changeable in the sheet conveying passage. The sheet conveying device included in the image reading device includes an original document conveying device configured to convey an original document having an image on a surface. The sheet conveying device included in the image forming apparatus includes a recording medium conveying device configured to convey the recording medium accommodated in a recording medium container to the image forming device.

12 Claims, 12 Drawing Sheets

(52) U.S. Cl.
CPC ...... *B65H 2511/13* (2013.01); *B65H 2515/82* (2013.01); *B65H 2601/521* (2013.01)

(56) References Cited

U.S. PATENT DOCUMENTS

| | | | |
|---|---|---|---|
| 2009/0184461 A1* | 7/2009 | Ishikawa | B65H 5/062 |
| | | | 271/254 |
| 2009/0324311 A1* | 12/2009 | Matsumoto | B65H 5/36 |
| | | | 399/400 |
| 2010/0207323 A1* | 8/2010 | Kumeta | B65H 5/38 |
| | | | 271/264 |
| 2011/0123236 A1* | 5/2011 | Yano | G03G 15/657 |
| | | | 399/304 |
| 2011/0221118 A1* | 9/2011 | Kamichika | B41J 11/0045 |
| | | | 271/4.12 |
| 2012/0235929 A1* | 9/2012 | Hongo | B65H 7/06 |
| | | | 345/173 |
| 2015/0001793 A1* | 1/2015 | Arimura | B65H 1/08 |
| | | | 271/241 |
| 2016/0170355 A1 | 6/2016 | Heishi et al. | |
| 2017/0180586 A1* | 6/2017 | Ochiai | G03G 21/1619 |

\* cited by examiner

SHEET CONVEYING DEVICE, IMAGE READING DEVICE INCORPORATING THE SHEET CONVEYING DEVICE, AND IMAGE FORMING APPARATUS INCORPORATING THE SHEET CONVEYING DEVICE

CROSS-REFERENCE TO RELATED APPLICATION

This patent application is based on and claims priority pursuant to 35 U.S.C. § 119(a) to Japanese Patent Application No. 2016-049564, filed on Mar. 14, 2016, in the Japan Patent Office, the entire disclosure of which is hereby incorporated by reference herein.

BACKGROUND

Technical Field

This disclosure relates to a sheet conveying device, an image reading device incorporating the sheet conveying device, and an image forming apparatus incorporating the sheet conveying device.

Related Art

Known various types of image forming apparatuses such as copiers, printer, and facsimile machines and image reading devices include a sheet conveying device to convey a sheet such as a recording medium to an image forming device or a sheet such as an original document to an image reading device.

For example, a known sheet conveying device includes a sound absorber having a configuration of a Helmholtz resonator including a hollow portion and a communication portion to cause the hollow portion to communicate with an outside of the sheet conveying device. The sound absorber is disposed in a sheet conveying passage in the sheet conveying device.

Sliding sound is generated when a conveyance passage forming device such as a guide member to form a sheet conveying passage and a sheet that is being conveyed through the sheet conveying passage. Leakage of the sliding sound to the outside of the sheet conveying device can be restrained by disposing the above-described sound absorber in the sheet conveying passage.

When sheets having paper types different from each other are conveyed, if property values such as the thickness and weight of each sheet to be conveyed change, the attitude of each sheet changes in the sheet conveying passage due to various property values such as the thickness and weight of respective sheets different from each other. Therefore, when a position at which the sheet slides in the conveyance passage forming device changes, a sound occurring position of the sliding sound also changes.

In the sound absorber having the configuration of a Helmholtz resonator, as the communication portion to cause the hollow portion to communicate with the outside of the sheet conveying device is disposed closer to a sound source, the sound absorbing efficiency increases. The sound occurs not only when a sound absorbing target is a sliding sound generated by changing the sound occurring position due to the change of the property value of the sheet but also when a sound absorbing target is a sound generated while the sheet is being conveyed and occurred at the sound occurring position changing in the sheet conveying passage.

SUMMARY

At least one aspect of this disclosure provides a sheet conveying device including a passage forming body and a sound absorber. The passage forming body is configured to define a sheet conveying passage through which a sheet passes. The sound absorber includes a hollow portion and a communication portion configured to communication the hollow portion and the sheet conveying passage. A position of the communication portion of the sound absorber is changeable in the sheet conveying passage.

Further, at least one aspect of this disclosure provides an image reading device including the above-described sheet conveying device and a sheet reader. The sheet conveying device includes an original document conveying device configured to convey an original document having an image on a surface. The sheet reader is configured to read the image formed on the original document conveyed by the original document conveying device.

Further, at least one aspect of this disclosure provides an image forming apparatus including the above-described image reading device and an image forming device. The image forming device is configured to form a print image based on the image formed on the original document read by the image reading device.

Further, at least one aspect of this disclosure provides an image forming apparatus including an image forming device and the above-described sheet conveying device. The image forming device is configured to form a print image on a recording medium. The sheet conveying device includes a recording medium conveying device configured to convey the recording medium accommodated in a recording medium container to the image forming device.

DETAILED DESCRIPTION

Figure 1:
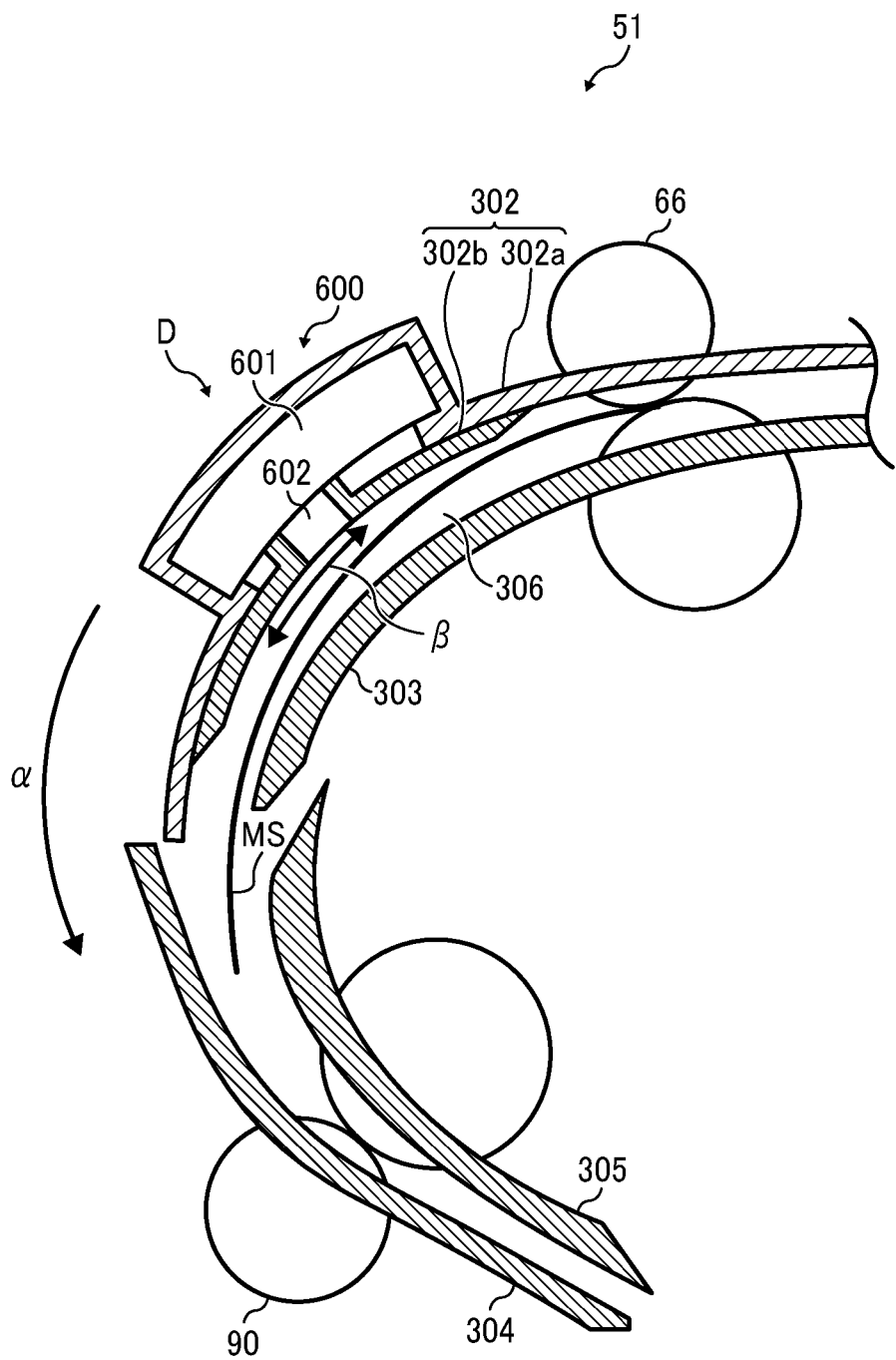
FIG. 1 is a diagram illustrating a turning part of an automatic document feeder, with a sound absorber disposed at the turning part.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

This disclosure is applicable to an automatic document feeder (hereinafter, referred to as an "ADF") that feeds and conveys an original document to a reading part of an image reading unit of a copier, a facsimile machine, and the like or an image reading device such as a scanner. This disclosure is not limited to the ADF but is also applicable to a sheet conveying device to convey a sheet such as an original document or a recording sheet, e.g., a sheet feeder that conveys a recording sheet from a sheet loader provided in a copier to another device provided in the copier.

The following embodiment of this disclosure describes a configuration and functions of a sheet through type automatic document feeder disposed on a copier (i.e., an image forming apparatus) to convey an original document, as an example.

Now a description is given of an electrophotographic image forming apparatus 500 for forming images by electrophotography. Hereinafter, the electrophotographic image forming apparatus 500 is referred simply to as the image forming apparatus 500.

It is to be noted that identical parts are given identical reference numerals and redundant descriptions are summarized or omitted accordingly.

The image forming apparatus 500 may be a copier, a facsimile machine, a printer, a multifunction peripheral or a multifunction printer (MFP) having at least one of copying, printing, scanning, facsimile, and plotter functions, or the like. According to the present example, the image forming apparatus 500 is an electrophotographic copier that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

At first, a description is given of a basic configuration of the image forming apparatus 500 according to the present embodiment of this disclosure.

Figure 2:
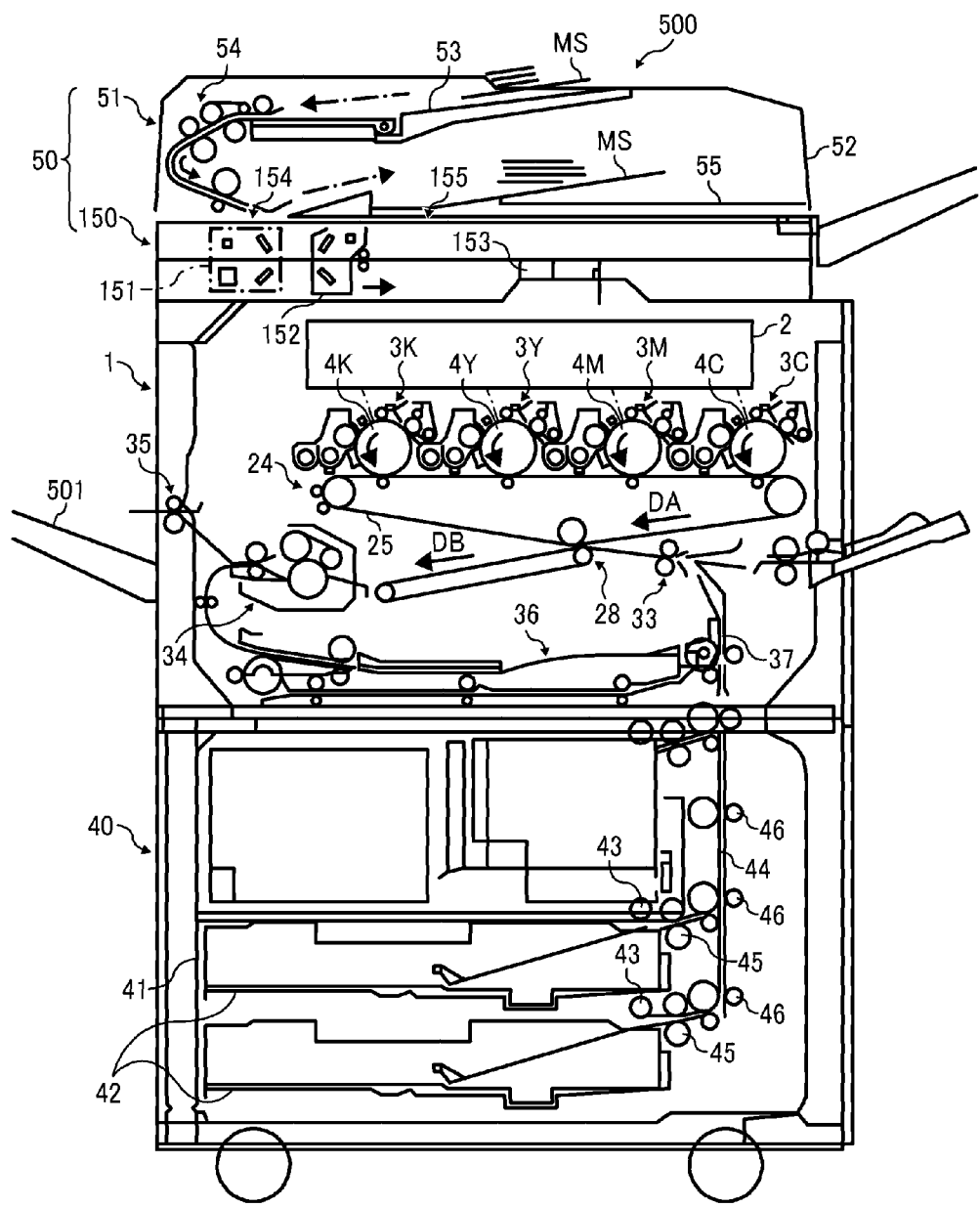
FIG. 2 is a schematic diagram illustrating an image forming apparatus according to an embodiment of this disclosure.

FIG. 2 is a schematic diagram illustrating the image forming apparatus 500 according to an embodiment of this disclosure.

The image forming apparatus 500 includes an image forming device 1, a sheet feeding device 40, and a document conveying and reading device 50.

The document conveying and reading device 50 includes a scanner 150 and an automatic document feeder (ADF) 51. The scanner 150 functions as a document reading unit fixedly mounted on the image forming device 1 of the image forming apparatus 500. The ADF 51 that functions as an original document conveying device is supported by the scanner 150.

As illustrated in FIG. 2, the sheet feeding device 40 includes a paper bank 41, two sheet trays 42 disposed vertically in the paper bank 41, sheet feed rollers 43 each provided to a corresponding sheet tray 42 to feed a recording sheet P functioning as a recording medium therefrom, a sheet feeding passage 44 along which the recording sheet P is fed and conveyed, separation rollers 45 each provided in the vicinity of a corresponding sheet tray 42 to separate the fed recording sheets P one by one and feed the separated recording sheet P to the sheet feeding passage 44, and multiple pairs of conveying rollers 46 to convey the recording sheet P toward a sheet conveying passage 37 of the image forming apparatus 500. The sheet conveying passage 37 functions as a conveying passage provided in the image forming device 1. Each sheet tray 42 accommodates a bundle of multiple recording sheets P therein. Each of the sheet feed rollers 43 contacts to press an uppermost recording sheet P in the sheet tray 42. As the corresponding sheet feed roller 43 rotates, the uppermost recording sheet P is fed from the sheet tray 42. Then, the recording sheet P accommodated in the sheet tray 42 is fed and conveyed to the sheet conveying passage 37 in the image forming device 1.

The image forming device 1 includes an optical writing unit 2, four process units 3K, 3Y, 3M, and 3C, a transfer unit 24, a sheet conveying unit 28, a pair of registration rollers 33, a fixing device 34, a switchback unit 36, and the sheet conveying passage 37.

The process units 3K, 3Y, 3M, and 3C form black, yellow, magenta, and cyan images, respectively.

The optical writing unit 2 includes a light source such as a laser diode and an LED. By driving the light source in the optical writing unit 2, laser lights LL, i.e., $LL_K$, $LL_Y$, $LL_M$, and $LL_C$ are emitted toward four drum-shaped photoconductors 4K, 4Y, 4M, and 4C to irradiate respective surfaces of the drum-shaped photoconductors 4K, 4Y 4M, and 4C. Consequently, electrostatic latent images of respective single colors are formed on the surfaces of the photoconductors 4K, 4Y, 4M, and 4C, which will be developed to visible toner images via a given development process.

Next, a description is given of a part of the configuration of the image forming device 1 included in the image forming apparatus 500.

Figure 3:
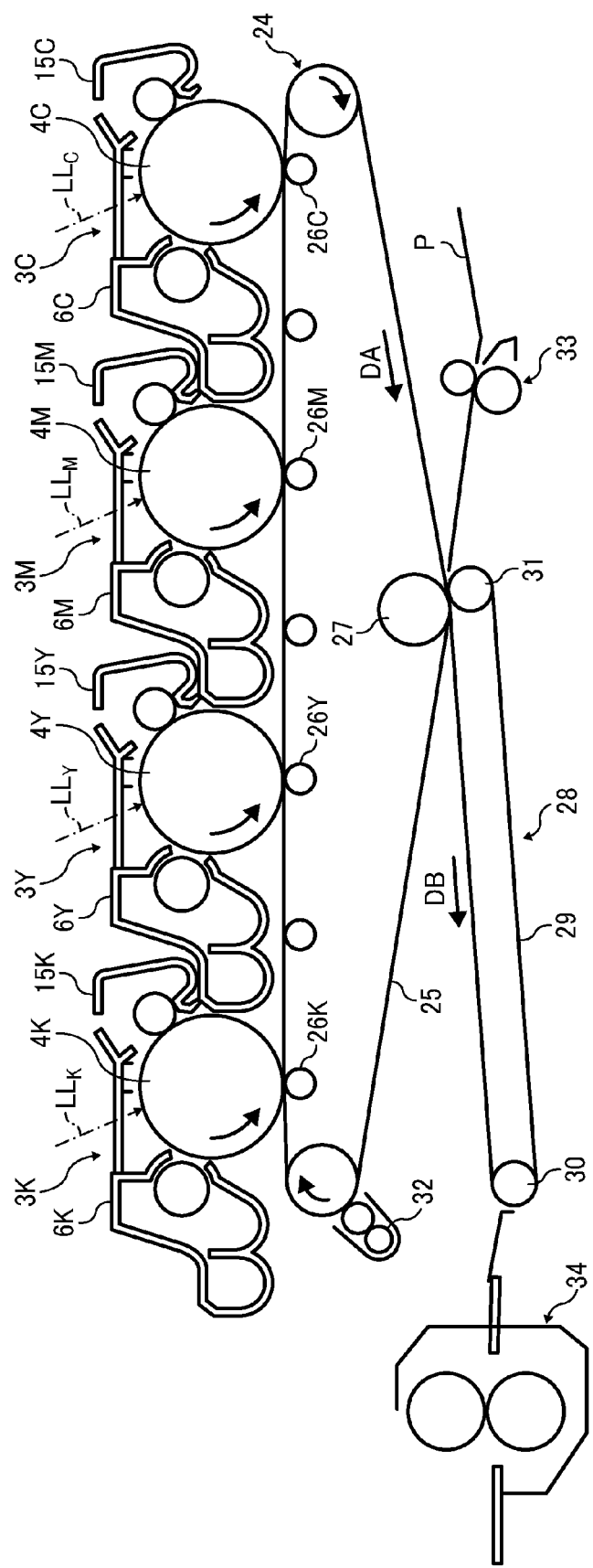
FIG. 3 is an enlarged diagram illustrating a part of an internal configuration of an image forming device of the image forming apparatus of FIG. 2.
Figure 4:
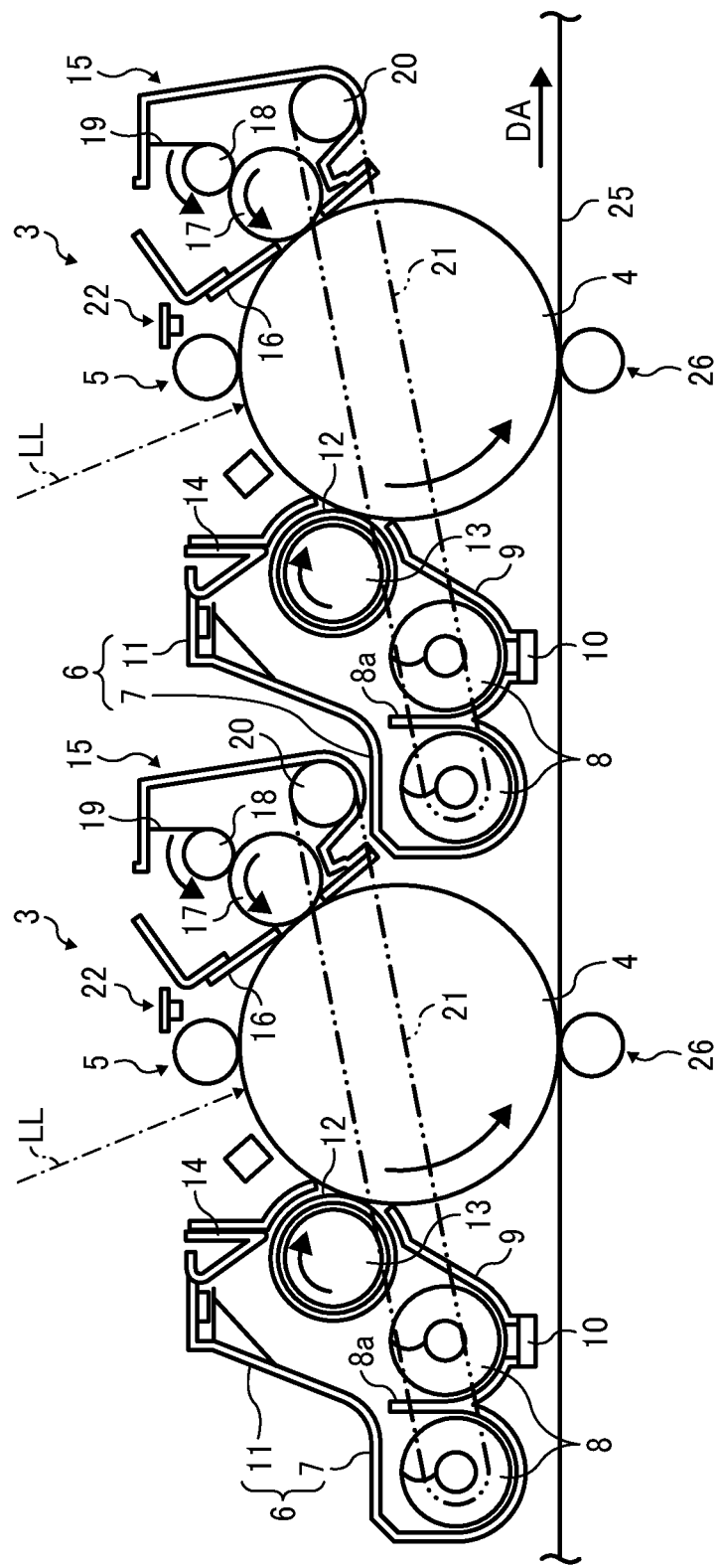
FIG. 4 is an enlarged view illustrating a part of a tandem-type configuration constructed by four process units in the image forming device of the image forming apparatus of FIG. 2.

FIG. 3 is an enlarged diagram illustrating a part of an internal configuration of the image forming device 1 of the image forming apparatus 500. FIG. 4 is an enlarged view illustrating a part of a tandem-type configuration constructed by the four process units 3K, 3Y, 3M, and 3C in the image forming device 1 of the image forming apparatus 500.

It is to be noted that the process units 3Y, 3M, 3C, and 3K illustrated in FIGS. 2 and 3 employ different single color toners, which are black (K), yellow (Y), magenta (M), and cyan (C) toners. Except for the colors of toners, the process units 3Y, 3M, 3C, and 3K have configurations identical to each other. Accordingly, FIG. 4 does not show any suffix indicating the difference of the toner colors.

The process units 3K, 3Y 3M, and 3C are supported by a common supporting unit. Each of the process units 3K, 3Y, 3M, and 3C includes a photoconductor 4 (i.e., photoconductors 4K, 4Y 4M, and 4C) and image forming units and components disposed around the photoconductor 4 as a single unit. The process units 3K, 3Y, 3M, and 3C are detachably attached to the image forming device 1 of the image forming apparatus 500.

It is to be noted that, the image forming units and components included in the image forming device 1 of the image forming apparatus 500 are hereinafter referred to in a singular unit occasionally without suffix indicating toner colors. For example, the process units 3K, 3Y, 3M, and 3C may also be referred to as "the process unit 3".

As illustrated in FIG. 4, the process unit 3 includes the photoconductor 4 and image forming units such as a charging device 5 that functions as a charger, a developing device 6 (i.e., developing devices 6K, 6Y, 6M, and 6C in FIG. 3), a drum cleaning device 15 (i.e., drum cleaning devices 15K, 15Y 15M, and 15C in FIG. 3), and an electric discharging lamp 22 disposed around the photoconductor 4.

The image forming device 500 has a tandem-type configuration in which the four process units 3K, 3Y, 3M, and 3C are disposed facing an intermediate transfer belt 25 having an endless loop along a direction of movement of the intermediate transfer belt 25.

The photoconductor 4 has a drum-shaped body with a photoconductive layer coated with organic photoconductor material over an aluminum elementary tube, for example. Alternately, the photoconductor 4 may have an endless belt body.

The developing device 6 employs two-component developer that includes magnetic carriers and non-magnetic toner. By using the two-component developer, the developing device 6 develops an electrophotographic latent image into a visible toner image.

The developing device 6 includes an agitating section 7 and a development section 11. The agitating section 7 stirs the two-component developer accommodated therein and conveys the two-component developer to a development sleeve 12. The development section 11 supplies the non-magnetic toner included in the two-component developer and held by the development sleeve 12 to the photoconductor 4.

The agitating section 7 is located at a position lower than the development section 11 and includes two transfer screws 8, a partition 8a, a development case 9, and a toner density sensor 10. The two transfer screws 8 are disposed in parallel to each other. The partition 8a is disposed between the transfer screws 8. The development case 9 has an opening or a slot to face the photoconductor 4. The toner density sensor 10 is disposed on the bottom of the development case 9.

The development section 11 includes the development sleeve 12, a magnetic roller 13, and a doctor blade 14. The development sleeve 12 faces the photoconductor 4 through the opening (or the slot) of the development case 9. The magnetic roller 13 is fixedly or unrotatably disposed inside the development sleeve 12. The doctor blade 14 is disposed adjacent to the development sleeve 12 and the leading end of the doctor blade 14 is disposed close to the development sleeve 12.

The development sleeve 12 has a non-magnetic, rotatable tubular body. The magnetic roller 13 has multiple magnetic poles arranged in the order in a rotation direction of the development sleeve 12, starting from an opposed position to the doctor blade 14. Each of these magnetic poles applies a magnetic force at a predetermined position in the rotation direction of the development sleeve 12, with respect to the two-component developer supplied on the development sleeve 12. With this action of the magnetic roller 13, the two-component developer that is conveyed from the agitating section 7 is attracted and attached to the surface of the development sleeve 12 and a magnetic brush of toner is formed along the lines of the magnetic force on the surface of the development sleeve 12.

In accordance with rotation of the development sleeve 12, the magnetic brush is regulated to have an appropriate layer thickness when passing by the opposed position to the doctor blade 14. Then, the magnetic brush is moved to a development region facing the photoconductor 4. Due to a difference of potentials between a development bias that is applied to the development sleeve 12 and an electrostatic latent image formed on the surface of the photoconductor 4, the toner is transferred onto the electrostatic latent image, so that the electrostatic latent image is developed into a visible toner image.

Further, in accordance with rotation of the development sleeve 12, the two-component developer that forms the magnetic brush and passes by the development region is returned to the development section 11. After leaving from the surface of the development sleeve 12 due to repulsion of the magnetic field formed between the magnetic poles of the magnetic roller 13, the two-component developer in a form of the magnetic brush is returned to the agitating section 7. An appropriate amount of toner is supplied to the two-component developer in the agitating section 7 based on a result or results detected by the toner density sensor 10.

It is to be noted that, alternative to the two-component developer, the developing device 6 according to the present embodiment may employ one-component developer that does not include magnetic carriers.

The drum cleaning device 15 includes a cleaning blade 16, a fur brush 17, an electric field roller 18, a scraper 19, a collection screw 20, and an outside recycle toner device 21.

The cleaning blade 16 is an elastic member of polyurethane rubber to be pressed against the photoconductor 4, so as to scrape residual toner remaining on the surface of the photoconductor 4. In the present embodiment, the drum cleaning device 15 employs a blade member such as the cleaning blade 16, however, the configuration is not limited thereto. Alternative to the blade member, a brush roller, for example, can be applied to the drum cleaning device 15.

The fur brush 17 is provided in order to increase cleanability. The fur brush 17 is a conductive member to slidably contact the photoconductor 4 and is rotatable in a direction indicated by arrow in FIG. 4. Specifically, an outer circumferential surface of the fur brush 17 contacts the surface of the photoconductor 4. The fur brush 17 also functions as an applier that scrapes a solid lubricant to obtain fine powder of lubricant and applies the fine powder to the surface of the photoconductor 4.

The electric field roller 18 is a metallic member that applies a bias to the fur brush 17. The electric field roller 18 is rotatably disposed in a direction indicated by arrow in FIG. 4.

The scraper 19 has a leading end that is pressed against the electric field roller 18.

The toner removed from the photoconductor 4 to be attached to the fur brush 17 is transferred onto the electric field roller 18 that contacts the fur brush 17 in a counter direction to be applied with a bias while the electric field roller 18 is rotating. After being scraped and removed from the electric field roller 18 by the scraper 19, the toner falls onto the collection screw 20.

The collection screw 20 conveys the collected toner toward an edge portion of the drum cleaning device 15 in a direction perpendicular to a sheet of the drawings and transfers the collected toner to an outside recycle transfer device 21.

The outside recycle toner device 21 transfers the collected toner to the developing device 6 for recycling or reusing.

The electric discharging lamp 22 removes residual electric charge remaining on the surface of the photoconductor 4 by photo irradiation. Thereafter, the electrically discharged surface of the photoconductor 4 is uniformly charged by the charging device 5 again and then optically irradiated by the optical writing unit 2.

It is to be noted that the charging device 5 includes a charging roller to apply a charge bias to the surface of the photoconductor 4 while rotating and contacting the photoconductor 4. Alternatively, the charging device 5 may be a scorotron charger that charges the photoconductor 4 without contacting the photoconductor 4.

By performing the above-described operations with the configuration illustrated in FIG. 3, black (K), yellow (Y), magenta (M), and cyan (C) toner images are formed on the photoconductors 4K, 4Y 4M, and 4C of the process units 3K, 3Y 3M, and 3C, respectively.

The transfer unit 24 is disposed below the process units 3K, 3Y 3M, and 3C. The intermediate transfer belt 25 is wound around multiple rollers with tension. One of the multiple rollers is a drive roller. The transfer unit 24 functions as a belt drive device to cause the intermediate transfer belt 25 to move by the drive roller of the multiple rollers endlessly in a clockwise direction indicated by arrow A in FIGS. 2 and 3 while the intermediate transfer belt 25 is contacting the photoconductors 4K, 4Y, 4M, and 4C. By so doing, respective primary transfer nip regions are formed between the photoconductors 4K, 4Y, 4M, and 4C and the intermediate transfer belt 25 having an endless loop.

Primary transfer rollers 26K, 26Y, 26M, and 26C are disposed near the respective primary transfer nip regions. The primary transfer rollers 26K, 26Y, 26M, and 26C are in contact with an inner loop of the intermediate transfer belt 25 to press the intermediate transfer belt 25 against the photoconductors 4K, 4Y, 4M, and 4C, respectively.

A power source applies the primary transfer bias to the primary transfer rollers 26K, 26Y, 26M, and 26C. With this action, respective primary electric fields are formed in the respective primary transfer nip regions for black, yellow, magenta, and cyan toner images so that the black, yellow, magenta, and cyan toner images formed on the photoconductors 4K, 4Y, 4M, and 4C, respectively, are electrostatically transferred onto the intermediate transfer belt 25.

Along with the endless movement of the intermediate transfer belt 25 in the clockwise direction DA in FIGS. 2 and 3, the intermediate transfer belt 25 passes through the primary transfer nip regions for the black, yellow, magenta, and cyan toner images sequentially. At the primary transfer nip regions, the toner images are sequentially transferred and overlaid onto the front surface of the intermediate transfer belt 25 for primary transfer. Due to the primary transfer of the toner images, a four-color composite toner image (hereinafter referred to as a four-color toner image) is formed on the front surface of the intermediate transfer belt 25.

The sheet conveying unit 28 is disposed below the transfer unit 24 in FIGS. 2 and 3. The sheet conveying unit 28 includes a sheet transfer belt 29, a drive roller 30, and a secondary transfer roller 31. The sheet transfer belt 29 is an endless belt that is wound around the drive roller 30 and the secondary transfer roller 31 and rotates in a counterclockwise direction indicated by arrow DB in FIGS. 2 and 3. The intermediate transfer belt 25 and the sheet transfer belt 29 are sandwiched between the secondary transfer roller 31 and the lower tension roller 27 of the transfer unit 24. With this configuration, a secondary transfer nip region in which the front surface of the intermediate transfer belt 25 and the front surface of the sheet transfer belt 29 are in contact with each other is formed.

The secondary transfer roller 31 of the sheet conveying unit 28 is applied with a secondary transfer bias by a power source. By contrast, the lower tension roller 27 of the transfer unit 24 is grounded. As a result, a secondary transfer electric field is formed in the secondary transfer nip region.

The pair of registration rollers 33 is disposed on a right side of the second transfer nip region in FIGS. 2 and 3. A registration roller sensor is disposed adjacent to an entrance of the registration nip region of the pair of registration rollers 33. The recording sheet P functioning as a recording medium is conveyed from the sheet feeding device 40 toward the pair of registration rollers 33. After a predetermined time has elapsed since detection of the leading end of the recording sheet P by the registration roller sensor, conveyance of the recording sheet P is stopped temporarily and the leading end of the recording sheet P comes to abut against the registration nip region of the pair of registration rollers 33. As a result, the leading end of the recording sheet P is held between the pair of registration rollers 33, so that the attitude of the recording sheet P is corrected to become ready to synchronize with image formation performed by the image forming device 1.

After the leading end of the recording sheet P contacts the registration nip region of the pair of registration rollers 33, the pair of registration rollers 33 restarts the rotation to synchronize movement of the recording sheet P with movement of the four-color toner image formed on the intermediate transfer belt 25, so that the recording sheet P nipped between the pair of registration rollers 33 is conveyed to the secondary transfer nip region.

In the secondary transfer nip region in which the recording sheet P passes, the four-color toner image formed on the intermediate transfer belt 25 contacts the recording sheet P. Due to action of the secondary transfer electric field and a nip pressure in the secondary transfer nip region, the four-color toner image is secondarily transferred onto the recording sheet P. By being mixed with a white color of a surface of the recording sheet P, the four-color toner image is developed to a full-color toner image.

After passing through the secondary transfer nip region, the recording sheet P having the full-color toner image on the surface thereof is stripped or separated from the intermediate transfer belt 25. Then, while being held on the front surface of the sheet transfer belt 29, the recording sheet P is conveyed to the fixing device 34 along with endless rotation of the sheet transfer belt 29 in the direction DB as illustrated in FIGS. 2 and 3.

After the secondary transfer of the toner image from the intermediate transfer belt 25 onto the recording sheet Pin the secondary transfer nip region, residual toner remains on the surface of the intermediate transfer belt 25. The residual toner is scraped and removed from the surface of the intermediate transfer belt 25 by a belt cleaning device 32 that is disposed in contact with the outer surface of the intermediate transfer belt 25.

The fixing device 34 fixes the full-color toner image to the recording sheet P by application of heat and pressure. Then, the recording sheet P having the fixed toner image thereon is conveyed from the fixing device 34 to a pair of sheet discharging rollers 35 to be discharged out of the body of the image forming apparatus 500 to an external sheet ejection tray 501.

As illustrated in FIG. 2, the switchback unit 36 that functions as a re-conveying device is disposed below the sheet conveying unit 28 and the fixing device 34.

In a duplex print job, after a full-color toner image is fixed to one side or a front surface of the recording sheet P, a separator is moved to select a direction of conveyance of the recording sheet P. Specifically, the direction of conveyance of the recording sheet P is switched to a passage to the switchback unit 36 by the separator. When the recording sheet P is conveyed to the switchback unit 36, the recording sheet P is reversed to enter the secondary transfer nip region of the image forming apparatus 500 again. There, a toner image is secondarily transferred onto the other side or a back surface of the recording sheet P, then is fixed to the recording sheet P, and is discharged via the pair of sheet discharging rollers 35 to the external sheet ejection tray 501.

Next, a description is given of the original document conveying and reading device 50 that is fixedly mounted on the image forming device 1.

The scanner 150 that is fixed onto the image forming device 1 includes a fixed image reading device 300 including two fixed scanning units (see below) and a movable scanning unit 152 that functions as a moving irradiation unit.

The movable scanning unit 152 is disposed immediately below a second contact glass 155 (see FIG. 2) that is fixed to an upper wall of a casing of the scanner 150 so as to contact an original document MS. The movable scanning unit 152 includes a light source and optical process units such as multiple reflection mirrors, so that these optical units can move in a sub scanning direction that is a left and right direction in FIG. 2. As the movable scanning unit 152 moves from the left side to the right side in FIG. 2, light emitted from the light source is reflected by the original document MS placed on the second contact glass 155. Thereafter, the reflected light travels via the multiple reflection mirrors to be received by image sensors 153 fixed to the casing of the scanner 150. The image sensors 153 are also referred to as charge coupled devices (CCDs) 153.

Figure 6:
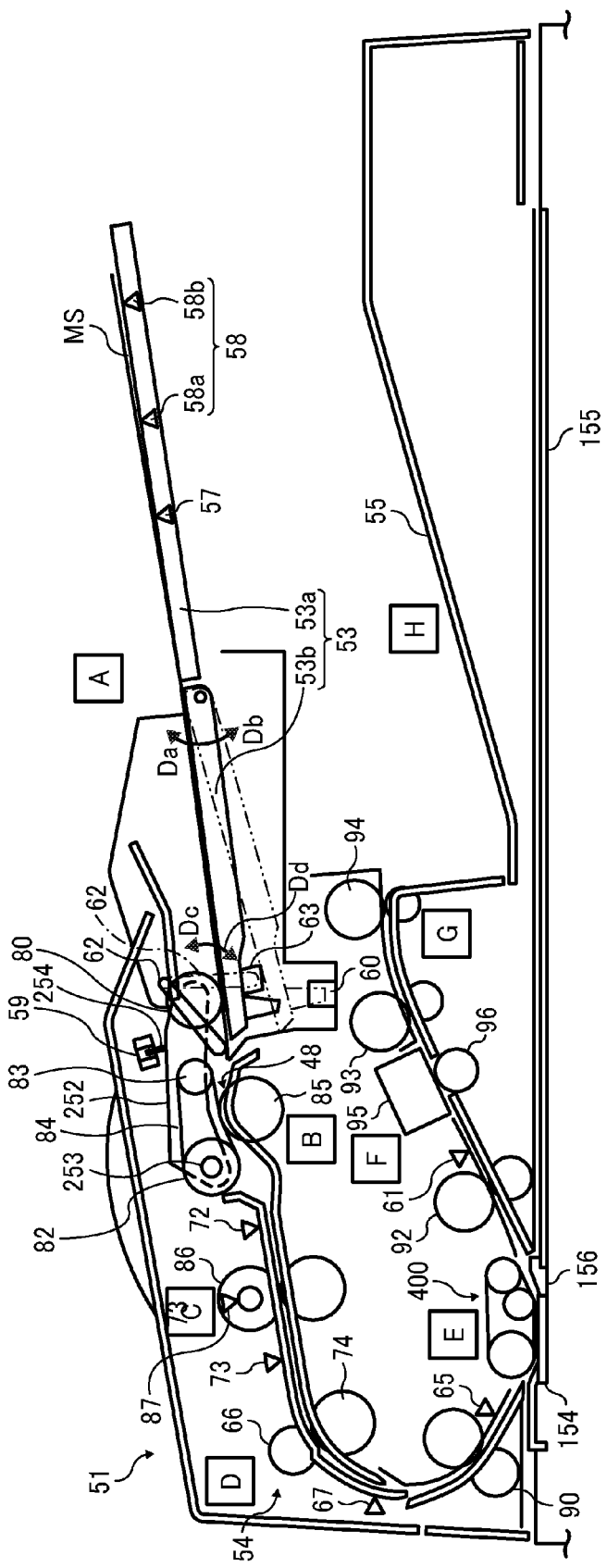
FIG. 6 is a diagram illustrating a schematic configuration of the ADF and an upper part of the scanner of FIG. 5.

By contrast, the fixed scanning unit of the original document conveying and reading device 50 includes a first fixed scanning unit 151 (see FIG. 2) and a second fixed scanning unit 95 (see FIG. 6). The first fixed scanning unit 151 is disposed inside the scanner 150 and the second fixed scanning unit 95 is disposed inside the ADF 51.

The first fixed scanning unit 151 includes a light source, multiple reflection mirrors, and image sensors 153 such as CCDs and is disposed immediately below a first contact glass 154 (see FIG. 5) that is fixed to the upper wall of the casing of the scanner 150, so that the first contact glass 154 contacts the original document MS. When the original document MS that is conveyed by ADF 51 passes on or over the first contact glass 154, as light emitted from the light source is reflected by one side or a front surface of the original document MS sequentially, the reflected light is received by the image sensors 153 via the multiple reflection mirrors. By so doing, one side or the front surface of the original document MS is scanned without moving the optical units such as the light source and the multiple reflection mirrors.

Further, the second fixed scanning unit 95 scans or reads the other side or a back surface of the original document MS after the original document MS has passed the first fixed scanning unit 151.

The ADF 51 that is disposed on the scanner 150 includes a body cover 52, a document loading tray 53, a document conveying unit 54, and a document stacker 55.

The body cover 52 holds and supports the document loading tray 53, the document conveying unit 54, and the document stacker 55. The document loading tray 53 loads the original document MS to be read. The document conveying unit 54 conveys the original document MS that functions as a sheet. The document stacker 55 receives and stacks the original document MS after the original document MS is read.

Figure 5:
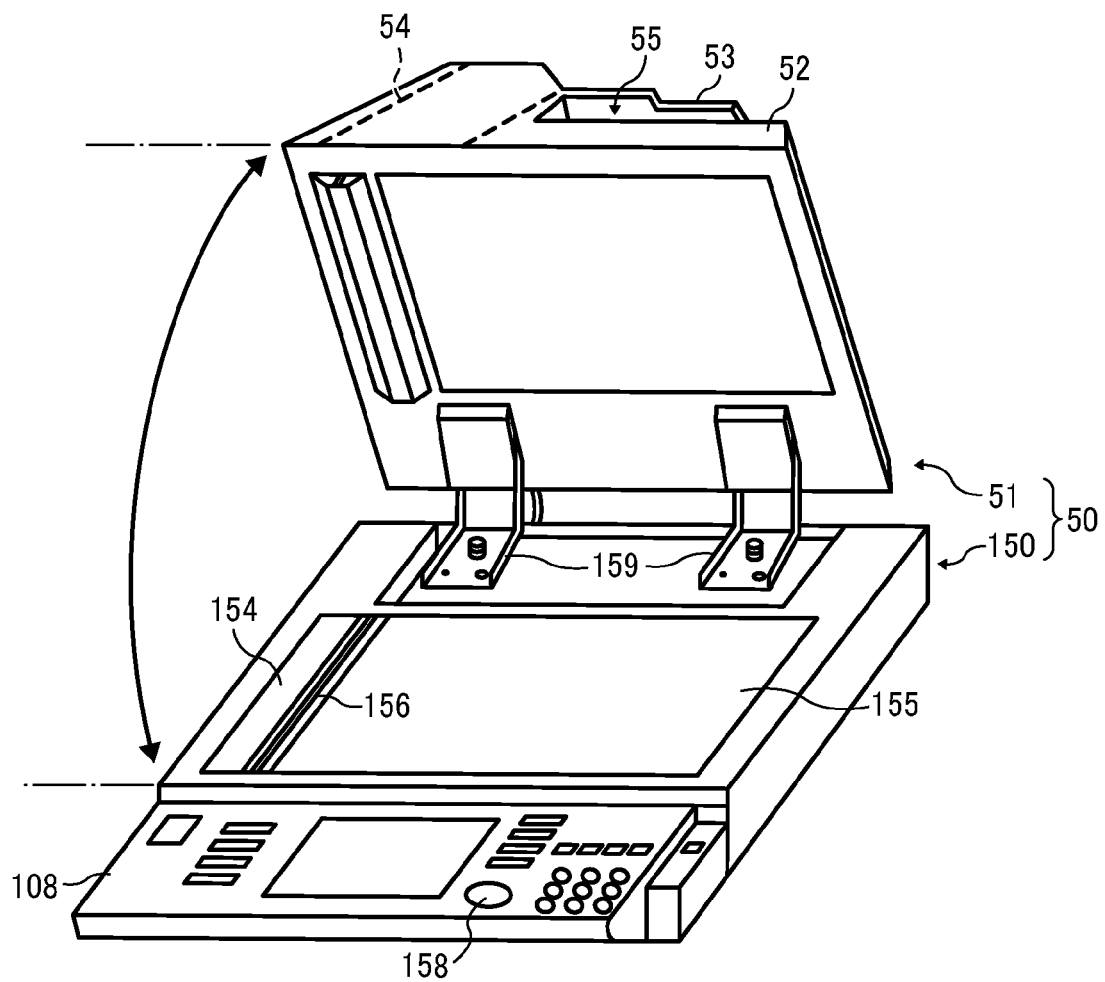
FIG. 5 is a perspective view illustrating a scanner and an automatic document feeder (ADF) included in the image forming apparatus of FIG. 2.

Now, FIG. 5 is a perspective view illustrating the scanner 150 and the ADF 51 included in the image forming apparatus 500.

As illustrated in FIG. 5, hinges 159 are fixed to the scanner 150 to connect the ADF 51 and the scanner 150. With the hinges 159 attached to the scanner 150, the body cover 52 opens or closes relative to the scanner 150 in a vertical direction. When the body cover 52 is open, the first contact glass 154 and the second contact glass 155 disposed on the upper surface of the scanner 150 are exposed.

When scanning a page of pages of a book or a bundle of original documents MS finished by one-side stitching or single stitching such as a book binding or stitching one corner of a bundle of original documents MS, each original document MS cannot be separated from the book, and therefore cannot be fed by the ADF 51. In order to avoid this inconvenience and scan images on the book or the original documents MS, the ADF 51 is opened as illustrated in FIG. 5, the scanning target page of the book or the bundle of original documents MS is placed on the second contact glass 155 with the face down, and the ADF 51 is closed. Then, the movable scanning unit 152 of the scanner 150 (see FIG. 2) scans and reads the image on the page of the book.

A left ruler 156 is disposed at a light corner of the second contact glass 155. When scanning an original document MS, the original document MS is placed on the second contact glass 155 by abutting at the scale of the left ruler 156 before being scanned.

By contrast, when feeding a page or pages of a bundle of original documents MS that are not bound and simply accumulated on each other, the ADF 51 separates and feeds the original documents MS one by one automatically, so that images on the separate original documents MS are sequentially read by the first fixed scanning unit 151 of the scanner 150 or the second fixed scanning unit 95 of the ADF 51. In this case, an operator or a user first sets the bundle of original documents MS on the document loading tray 53, and then presses a copy start button 158 (see FIG. 5) of an instruction input unit 108. The first fixed scanning unit 151 of the scanner 150 or the second fixed scanning unit 95 of the ADF 51 reads and scans the original document MS sequentially.

After the copy start button 158 is pressed, the ADF 51 causes each original document MS of the bundle loaded on the document loading tray 53 is fed to the document conveying unit 54. Then, as the original document MS is being reversed, the original document MS is conveyed to the document stacker 55.

In the process of this conveyance, the original document MS is caused to pass just above the first fixed scanning unit 151 of the scanner 150 immediately after the original document MS is reversed. At this time, the image on the front surface of the original document MS is read by the first fixed scanning unit 151 of the scanner 150.

Next, a description is given of the ADF 51.

FIG. 6 is a diagram illustrating a schematic configuration of the ADF 51 and an upper part of the scanner 150.

The ADF 51 includes a document setting part A, a document separating and feeding part B, a registration part C, a turning part D, a first reading and conveying part E, a second reading and conveying part F, a document ejecting part G, and a document stacking part H. The document conveying unit 54 of the ADF 51 of the present embodiment is a part that configures a passage from a detection position by a document contact sensor 72 that is disposed on a downstream side of the separating and feeding part B to a pair of reading inlet rollers 90, through which the original document MS is conveyed.

The document conveying and reading device 50 including the ADF 51 conveys the original document MS as a recording medium to be read to the first fixed scanning unit 151 and the second fixed scanning unit 95, which are included in and function as the fixed image reading device 300, and reads an image formed on the original document MS while conveying the original document MS at a predetermined speed.

The document setting part A includes the document loading tray 53 on which a bundle of original document MS is set such that first surfaces of the original document MS face upward.

The document separating and feeding part B includes a pickup roller 80, a separation belt 84, and a reverse roller 85, and separates and feeds the original document MS one by one from the bundle of the original document MS set on the document loading tray 53.

The registration part C has a function to adjust and primarily contact the fed original document MS and a function to pull out and convey the adjusted original document MS.

The turning part D includes a curved conveying portion curved in a C shape, and causes the original document MS conveyed in the curved conveying part to be turned and inverted upside down while folding back the original document MS, and conveys the original document MS to cause the first surface to face the first fixed scanning unit 151 below.

In the first reading and conveying part E, the original document MS is conveyed on the first contact glass 154 including an exposure glass. Then, while the original document MS is being conveyed, the first surface of the original document MS is read by the first fixed scanning unit 151 arranged inside the scanner 150 from below the first contact glass 154.

The second reading and conveying part F causes the second surface of the original document MS to be read by the second fixed scanning unit 95 from above while the original document MS that has passed through the reading position in the first fixed scanning unit 151 is being conveyed with a second reader opposing roller 96 arranged below the second fixed scanning unit 95.

The document ejecting part G discharges the original document MS having passed through the reading position in the first fixed scanning unit 151 and the reading position in the second fixed scanning unit 95 toward the document stacking part H outside the image forming apparatus 500.

The document stacking part H loads and holds the original document MS after completion of reading on the document stacker 55.

Figure 7:
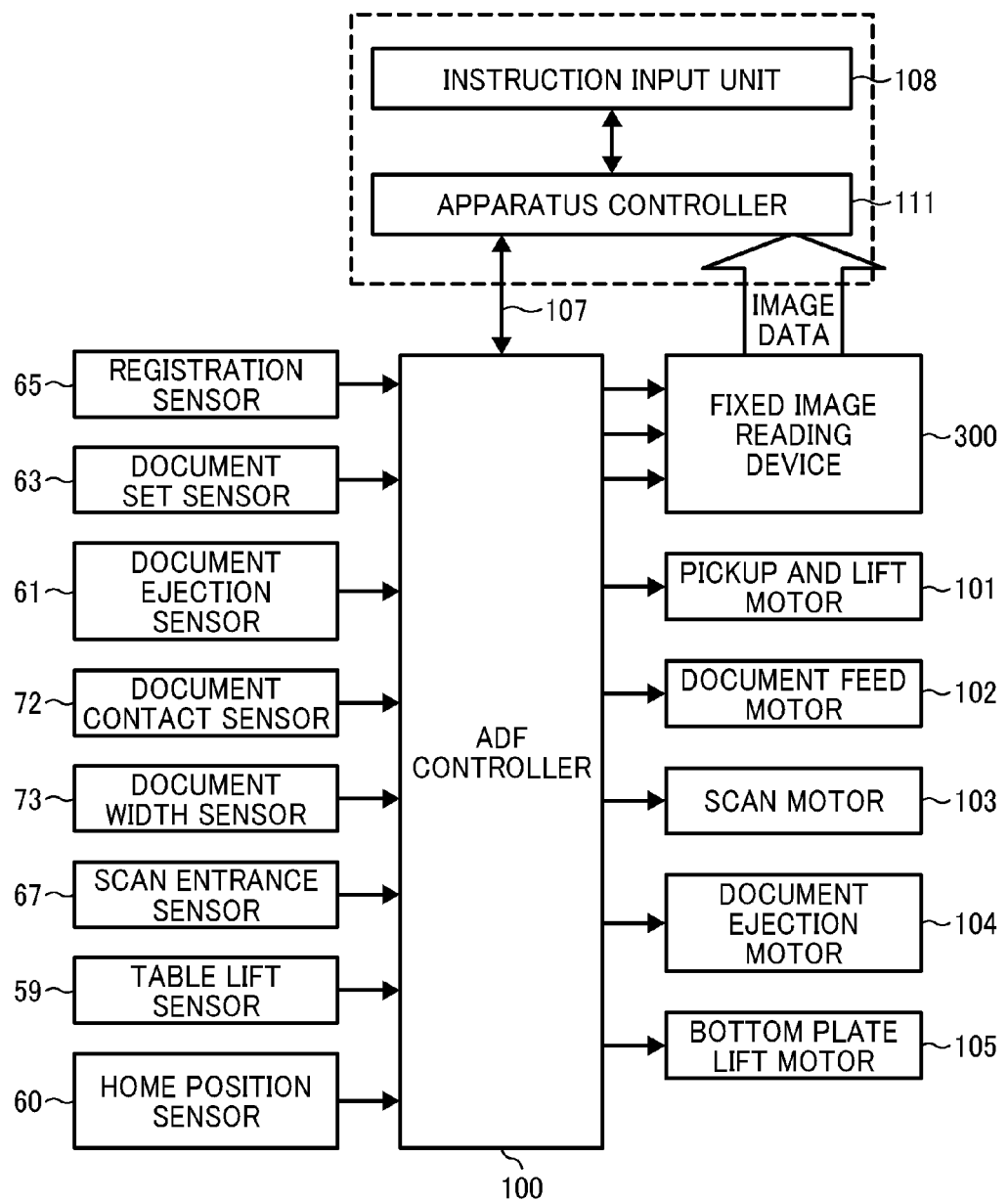
FIG. 7 is a block diagram illustrating a controller of the ADF.

FIG. 7 is a block diagram illustrating an entire configuration of an ADF controller 100 of the ADF 51.

The ADF controller 100 of the ADF 51 controls a series of operations of motors, various sensors, and the fixed image reading device 300. Motors (a pickup and lift motor 101, a document feed motor 102, a scan motor 103, a document ejection motor 104, and a bottom plate lift motor 105) are drive units that perform a conveying operation of the original document MS, and the fixed image reading device 300 acts as the first fixed scanning unit 151 or the second fixed scanning unit 95.

Figure 8:
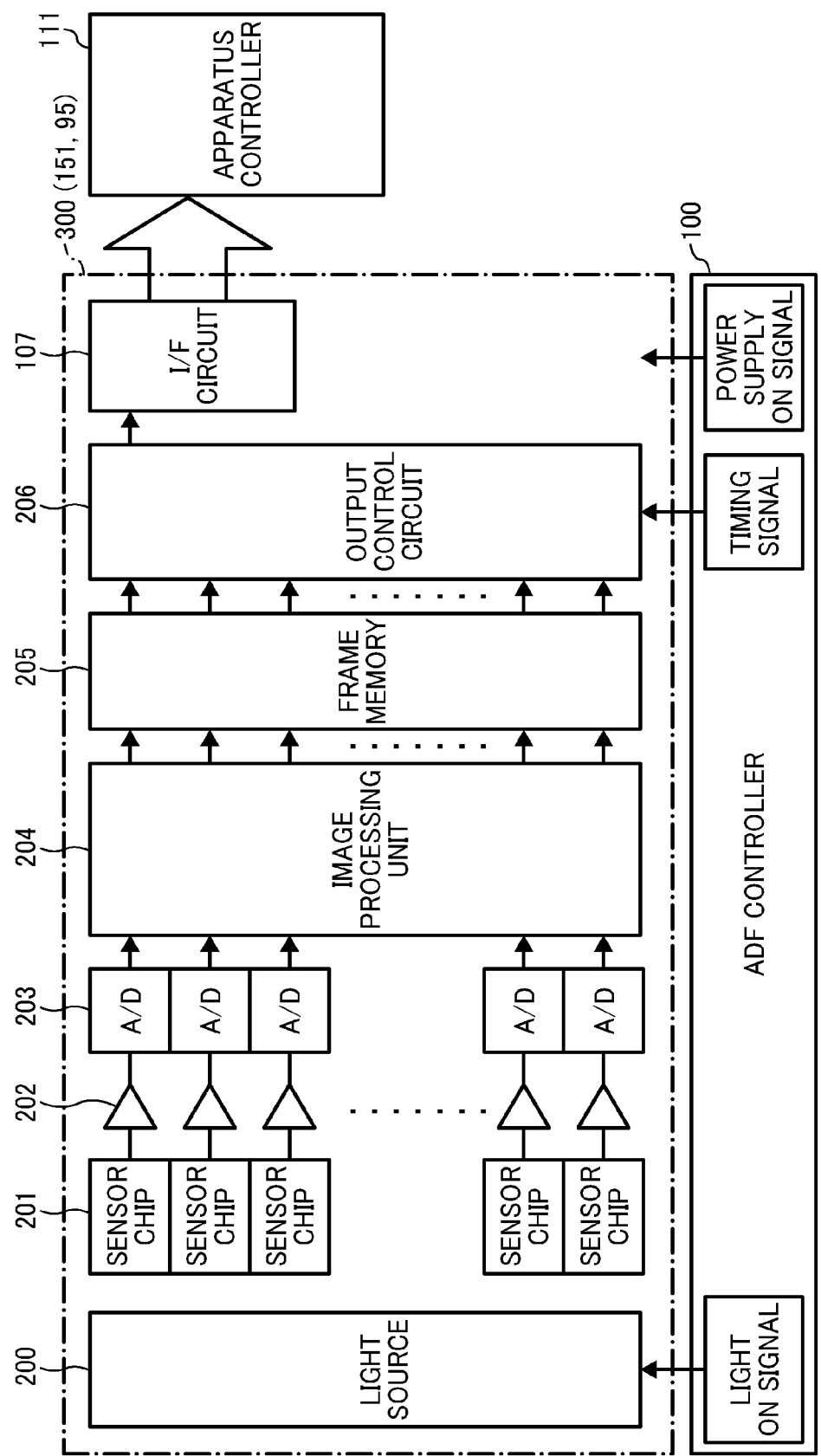
FIG. 8 is a block diagram illustrating a main part of an electric circuit of a fixed image reading device included in the image forming apparatus.

FIG. 8 is a block diagram illustrating a main part of an electric circuit of the fixed image reading device 300 included in the image forming apparatus 500.

The fixed image reading device 300 includes a light source 200, a plurality of sensor chips 201, an image processing unit 204, a frame memory 205, an output control circuit 206, an interface circuit 107 (hereinafter, referred to as an I/F circuit 107).

The light source 200 includes an LED array, a fluorescent light, or a cold cathode tube. The plurality of sensor chips 201 are arranged side by side in a main scanning direction (a direction corresponding to a document width direction). A plurality of operational (OP) amplifier circuits 202 are connected to the plurality of sensor chips 201, respectively. A plurality of analog-to-digital (A/D) converters 203 are connected to the plurality of OP amplifier circuits 202, respectively.

Each of the plurality of sensor chips 201 includes a photoelectric conversion element and a condenser lens. The photoelectric conversion element corresponds to an unmagnified contact image sensor. Prior to entry of the original document MS to the reading position in the fixed image reading device 300, the ADF controller 100 transmits a light ON signal to the light source 200. On receipt of the light ON signal, the light source 200 is turned on to emit laser light toward to the original document so as to irradiate the surface (e.g., the first surface in the case of the first fixed scanning unit 151 and the second surface in the case of the second fixed scanning unit 95) of the original document MS with the laser light LL. The light reflected on the surface of the original document MS is collected by the condenser lens to the photoelectric conversion element and is read as image data in each of the plurality of sensor chips 201. The image data read in the plurality of sensor chips 201 is amplified by the plurality of OP amplifier circuits 202, and is then converted to digital image data by the plurality of A/D converters 203, respectively.

The thus obtained digital image data is inputted to the image processing unit 204, is adjusted by shading, and is temporarily stored in the frame memory 205. After the output control circuit 206 has converted the digital data into a data format that can be received by an apparatus controller 111 (a controller of an apparatus body of the image forming apparatus 500), the digital data is output as image data to the apparatus controller 111 via the I/F circuit 107.

It is to be noted that the ADF controller 100 outputs a timing signal, a light ON signal, a power supply ON signal and so forth to inform a timing at which the leading end of the original document MS reaches the reading position in the fixed image reading device 300. Image data after the timing is considered as valid image data.

The bundle of the original document MS to be read is set on the document loading tray 53 in a state in which the first surface of the original document MS faces upward. The document loading tray 53 includes a fixed document table 53a and a movable document table 53b. The movable document table 53b supports the leading end side of the original document MS and is swingable in arrows Da-Db directions in FIG. 6 according to the thickness of the bundle of the original document MS. The fixed document table 53a supports a trailing end side of the original document MS.

Further, the document loading tray 53 is provided with side guides respectively contacting against both lateral ends of the original document MS in a width direction (a direction perpendicular to a document conveying direction of the original document MS and is a direction perpendicular to the face of the drawing sheet of FIG. 6). Then, when the original document MS are set on the document loading tray 53, the side guides respectively contact against the both lateral ends of the original document MS in the width direction, so as to perform positioning of the original document MS in the width direction.

A set feeler 62 as a lever member is swingably arranged above the movable document table 53b. The set feeler 62 is disposed at the position illustrated by the broken line in FIG. 6 in a state in which no original document MS are set on the document loading tray 53. This position is a detection position by a document set sensor 63, and whether or not the original document MS being is set on the document loading tray 53 is detected due to the detection result of the set feeler 62 by the document set sensor 63.

As the original document MS is set on the document loading tray 53, the leading end of the original document MS pushes up the set feeler 62. With the pushing up of the set feeler 62 by the original document MS, the set feeler 62 is moved from a detection position of the document set sensor 63. Accordingly, when a state in which the original document MS is set on the document loading tray 53 is detected, the document set sensor 63 detects no set feeler 62. Then, the document set sensor 63 transmits a detection signal to the ADF controller 100. The detection signal is transmitted from the ADF controller 100 to the apparatus controller 111 of the document conveying and reading device 50 via the I/F circuit 107.

The fixed document table 53a further includes a reflection-type photosensor or a plurality of document length sensors 57 and 58. The reflection-type photosensor detects the length of the original document MS in the document conveying direction. The plurality of document length sensors 57 and 58 (including sensors 58a and 58b) include actuator-type sensors that can detect even one original document MS. A rough length of the original document MS in the document conveying direction is determined by the plurality of document length sensors 57 and 58. The plurality of document length sensors 57 and 58 are disposed such that the sensor arrangement determines at least the longitudinal or lateral size of the original documents MS having the same size.

The pickup roller 80 is arranged above the movable document table 53b. The pickup roller 80 is driven to rotate as a driving force is transmitted from the document feed motor 102. Further, the separation belt 84 and the reverse roller 85 that configure a separation nip region as a separating part are driven to rotate as the driving force is transmitted from the document feed motor 102.

The movable document table 53b swings in directions indicated by arrows Da-Db in FIG. 6 by a cam mechanism driven by driving of the bottom plate lift motor 105. When the original document MS is set on the document loading tray 53 and the setting of the original document MS is detected by the set feeler 62 and the document set sensor 63, the ADF controller 100 rotates the bottom plate lift motor 105 in a normal direction. When the bottom plate lift motor 105 is rotated in the normal direction, the movable document table 53b is rotated in the direction Da in FIG. 6, and a free end side (a left side in FIG. 6) of the movable document table 53b elevates. The bundle of the original documents MS set on the document loading tray 53 also elevates together with the free end side of the movable document table 53b, and an uppermost surface of the bundle of the original documents MS comes in contact with the pickup roller 80.

The pickup roller 80 is rotatably supported by one end (a right end in FIG. 6) of a pickup bracket 252. Further, the pickup bracket 252 is rotatable in directions indicated by arrows Dc-Dd illustrated in FIG. 6 around a document feeding unit drive shaft 253 on the other end portion side (a left end portion side in FIG. 6). The pickup bracket 252 is rotated in the directions Dc-Dd illustrated in FIG. 6 by a cam mechanism driven by the pickup and lift motor 101. Then, the pickup roller 80 is moved in the directions Dc-Dd illustrated in FIG. 6 as the pickup bracket 252 is rotated in the directions Dc-Dd illustrated in FIG. 6.

Further, the pickup bracket 252 that supports the pickup roller 80 includes a bracket detection target 254. Further, a table lift sensor 59 is arranged in a frame of a main body of the ADF 51 at a position above the pickup bracket 252.

The table lift sensor 59 is a sensor that detects whether the pickup roller 80 is in a lifting position by detecting existence or non-existence of the bracket detaction target 254 in the detection position.

The table lift sensor 59 is a light transmission-type optical sensor that detects whether laser light emitted from a light emitting portion is shielded in a detection position between a light emitting portion and a light receiving portion. Then, the bracket detaction target 254 disposed at the detection position of the table lift sensor 59 is detected as the bracket detaction target 254 shields the laser light in the detection position of the table lift sensor 59.

When the pickup roller 80 is pushed by an upper surface of the original document MS on the movable document table 53b as the movable document table 53b elevates in a state in which the pickup roller 80 is rotated to be lowered in the direction Dd in FIG. 6, the pickup roller 80 is rotated and lifted in the direction Dc as illustrated in FIG. 6. The table lift sensor 59 can detect that the movable document table 53b has elevated to an upper limit by detecting the above operation. With the detection of the lifting of the movable document table 53b to the upper limit, the pickup and lift motor 101 is stopped and the bottom plate lift motor 105 is stopped, and the original document MS is nipped by the movable document table 53b and the pickup roller 80.

The table lift sensor 59 is a sensor that detects that a bottom plate has elevated to the upper limit, so as to detect that an upper surface of the bundle of the original document MS is kept to an proper sheet feeding height. When the table lift sensor 59 is turned to an ON state to detect the bracket detection target 254, rising of the movable document table 53b that is the bottom plate is stopped, and the sheet feeding is repeated. By repetition of the sheet feeding, a position of the upper surface of the bundle of the original documents MS lowers. When the detection state of the table lift sensor 59 is turned to an OFF state, the control to elevate the movable document table 53b is repeated so that the table lift sensor 59 is turned to the ON state again. With this control, the position of the upper surface of the bundle of the original document MS can be constantly maintained to the height suitable for sheet feeding.

When the whole original documents MS set on the document loading tray 53 have been fed, the bottom plate lift motor 105 is reversely rotated, and the movable document table 53b is lowered to a home position so that a subsequent bundle of original documents MS can be set. When the movable document table 53b is lowered to the home position, a feeler provided in a lower part of the movable document table 53b is detected by a home position sensor 60.

In the present embodiment, both of the movable document table 53b and the pickup roller 80 include a lifting mechanism. However, as a mechanism to hold the original document MS by nipping, a configuration in which either one of the movable document table 53b and the pickup roller 80 includes the lifting mechanism may be employed.

A user selects one of a duplex scanning mode or a single side scanning mode, and presses the copy start button 158 on the instruction input unit 108 in a state in which the original documents MS are set on the document loading tray 53. When the copy start button 158 is pressed, a document feed signal is transmitted from the apparatus controller 111 to the ADF controller 100 as a controller of the ADF 51 via the I/F circuit 107. Accordingly, the document feed motor 102 is driven in the normal direction. With the driving of the sheet feed motor 102 in the normal direction, the pickup roller 80 is driven and rotated, and picks up several original documents MS (ideally, one original document MS) set on the document loading tray 53. The direction of rotation of the pickup roller 80 at this time is a clockwise direction in FIG. 6 into which the uppermost original document MS placed on top of the bundle of the original documents MS set on the document loading tray 53 is conveyed toward a separation nip region described below.

Here, in a case of setting either the duplex scanning mode or the single side scanning mode, the equal setting may be made to the whole original documents MS set on the document loading tray 53, or different setting may be made to respective original documents MS (e.g., a first original document, a second original document, . . . , and an n-th original document). As the different setting, for example, the duplex scanning mode is set to the first and tenth original document MS, and the single side scanning mode is set to the other original documents MS of a total of ten original documents MS.

The original document MS sent by the pickup roller 80 is conveyed to a separation inlet 48 of the separation nip region as a contact position of the separation belt 84 and the reverse roller 85. The separation belt 84 is stretched over a sheet feeding drive roller 82 and a sheet feeding driven roller 83, and is endlessly moved in a document feeding direction (the clockwise direction in FIG. 6) by rotation of the sheet feeding drive roller 82 associated with rotation of the sheet feed motor 102 in the normal rotation.

The reverse roller 85 is in contact with a lower stretched surface of the separation belt 84. A driving force to rotate in a reverse direction (the clockwise direction in FIG. 6) to the document feeding direction is transmitted to the reverse roller 85 by rotation of the sheet feed motor 102 in the normal direction. As described above, a surface moving direction in the separation nip region of the separation belt 84 and the reverse roller 85 is the reverse direction, and thus the uppermost original document MS placed on top of the bundle of the original documents MS and the original document MS located under the uppermost original document MS are separated, so that a sing sheet, which is the uppermost original document MS, can be fed.

To be more specific, in the separation nip region as the contact part of the separation belt 84 and the reverse roller 85, the surface of the separation belt 84 is moved in the document feeding direction. By contrast, the surface of the reverse roller 85 is intended to be moved in the reverse direction to the document feeding direction. However, a torque limiter is provided in a drive transmission part of the reverse roller 85. Therefore, when a force of the surface of the reverse roller 85 toward the document feeding direction is larger than an upper limit torque of the torque limiter, the reverse roller 85 is rotated in a counterclockwise direction in FIG. 6 so that the surface of the reverse roller 85 is moved in the document feeding direction.

The reverse roller 85 is in contact with the separation belt 84 with a predetermined pressure. The reverse roller 85 is rotated together with the separation belt 84 or the original document MS in a state in which the reverse roller 85 is directly in contact with the separation belt 84 or a state in which the reverse roller 85 is in contact with the separation belt 84 via a single original document MS (in a state in which a single original document MS is nipped in the separation nip). That is, the reverse roller 85 is rotated in the counterclockwise direction in FIG. 6 that is the document feeding direction.

By contrast, when two or more original documents MS are nipped and held in the separation nip region, the torque limiter is set to made a corotation force lower than the upper limit torque of the torque limiter. Therefore, the reverse roller 85 is driven and rotated in the clockwise direction in FIG. 6 that is a direction opposite to a corotating direction. When the reverse roller 85 is driven to rotate in the direction opposite to the corotation direction, the reverse roller 85 applies a moving force in a reverse direction opposite to the document feeding direction to the original documents MS conveyed toward the separation nip region, except the uppermost original document MS. With this operation, extra original documents MS are pushed back, and the uppermost original document MS is separated from the plurality of original documents MS. Accordingly, multi-feeding of the original documents MS is prevented.

The single original document MS separated from the other original documents MS by the action of the separation belt 84 and the reverse roller 85 enters the registration part C. Then, the original document MS is further conveyed by the separation belt 84. After the document contact sensor 72 has detected the leading end of the original document MS, the original document MS is further conveyed until the leading end of the original document MS contacts against a pair of pullout rollers 86 that is not rotated. The document feed motor 102 that is being driven at this time is driven for a predetermined time from a timing in which the document contact sensor 72 has detected the leading end of the original document MS, and is then stopped. Accordingly, the original document MS is conveyed by a predetermined distance from the detection position of the leading end of the original document MS by the document contact sensor 72. Eventually, conveyance of the original document MS by the separation belt 84 is stopped in a state in which the original document MS is pushed against the pair of pullout rollers 86 with a predetermined amount of bending.

The pickup and lift motor 101 is rotated when the leading end of the original document MS is detected by the document contact sensor 72. By so doing, the pickup roller 80 is retracted from the upper surface of the original document MS, and the original document MS is conveyed by a conveying force of the separation belt 84. Accordingly, the leading end of the original document MS enters a nip region formed by the upper and lower rollers of the pair of pullout rollers 86, and adjustment (skew correction) of the leading end of the original document MS is performed.

As described above, the pair of pullout rollers 86 is a pair of rollers having a function to perform skew correction and a function to convey the original document MS, to which the skew correction is performed after the sheet separation, to a pair of intermediate rollers 66. When the document feed motor 102 is reversely driven, one of the two rollers that configure the pair of pullout rollers 86 is driven and rotated to convey the original document MS. When the document feed motor 102 is reversely driven, a driving force is inputted to the pair of pullout rollers 86 and the pair of intermediate rollers 66, and no driving force is inputted to the pickup roller 80, the separation belt 84, and the reverse roller 85. Specifically, when the document feed motor 102 is rotated in the normal direction, the driving force is transmitted to the pickup roller 80, the separation belt 84, and the reverse roller 85. By contrast, when the document feed motor 102 is rotated in the reverse direction opposite to the normal direction, the driving force is transmitted to the pair of pullout rollers 86 and the pair of intermediate rollers 66.

The original document MS conveyed by the pair of pullout rollers 86 passes immediately below a document width sensor 73. The document width sensor 73 is a sensor that has a plurality of sheet detecting sensors. Each of the plurality of sheet detecting sensors includes a reflection-type photosensor that is arranged in the document width direction (i.e., the direction perpendicular to the surface of the drawing sheet of FIG. 6). Then, the size of the original document MS is detected based on which one of the sheet detecting sensors detects the original document MS. Further, the length of the original document MS in the document conveying direction is detected from a motor pulse on the basis of a timing from when the leading end of the original document MS is detected by the document contact sensor 72 to when the original document MS becomes undetected by the document contact sensor 72 (i.e., when the trailing end of the original document MS passes through the document contact sensor 72).

The original document MS to be conveyed by the driving and rotation of the pair of pullout rollers 86 and the pair of intermediate rollers 66 enters the turning part D in which the original document MS is conveyed by the pair of intermediate rollers 66 and the pair of reading inlet rollers 90.

In the ADF 51, when the original document MS is conveyed from the registration part C to the turning part D by the driving and rotation of the pair of pullout rollers 86 and the pair of intermediate rollers 66, a speed of conveyance of the original document MS in the registration part C is set faster than a speed of conveyance of the original document MS in the first reading and conveying part E. Accordingly, a processing time to convey the original document MS to the first reading and conveying part E is shortened.

When the leading end of the original document MS is detected by a scan entrance sensor 67, deceleration of speed of the document feed motor 102 is started. At the same time, the scan motor 103 is driven to rotate in the normal direction. When the scan motor 103 is driven and rotated in the normal direction, the pair of reading inlet rollers 97, a pair of reading outlet rollers 92, and a pair of second reading outlet rollers 93 are driven and rotated in the document conveying direction. When the document feed motor 102 is decelerated, a rotating speed of the pair of intermediate rollers 66 driven and rotated by the document feed motor 102 is decreased. Accordingly, before the leading end of the original document MS enters a nip region formed by the upper and lower rollers of the pair of reading inlet rollers 97, the speed of conveyance of the original document MS is set to be equal to the speed of conveyance of the original document in the first reading and conveying part E.

When the leading end of the original document MS from the turning part D toward the first reading and conveying part E is detected by a registration sensor 65, the ADF controller 100 gradually decreases the driving speeds of the motors with a predetermined time. By so doing, the speed of conveyance of the original document MS is decreased in a predetermined conveyance distance. Then, the ADF controller 100 controls the original document MS to be temporarily stopped immediately before a first reading position 400 at which an image formed on the first surface of the original document MS is read by the first fixed scanning unit 151. Further, together with the control of the temporary stop of the original document MS, the ADF controller 100 transmits a signal to stop the pair of registration rollers 33 to the apparatus controller 111 via the I/F circuit 107.

Then, upon receipt of a reading start signal from the apparatus controller 111, the ADF controller 100 starts driving of the scan motor 103. At this time, the ADF controller 100 controls driving of the scan motor 103 such that the speed of conveyance of the original document MS rises to a predetermined speed of conveyance of the original document MS by the leading end of the original document MS that has been stopped at the pair of registration rollers 33 reaches the first reading position 400. Accordingly, the original document MS is conveyed toward the first reading position 400 as the speed of conveyance of the original document MS increases.

Next, a timing when the leading end of the original document MS reaches the first reading position 400 is detected. The timing is calculated on the basis of a pulse count of the scan motor 103. Then, the ADF controller 100 transmits a gate signal that indicates a sub-scanning direction effective image area of the first surface of the original document MS to the apparatus controller 111 at the detected timing. Transmission of the gate signal is continuously performed until the trailing end of the original document MS exits from the first reading position 400, and the first surface of the original document MS is read by the first fixed scanning unit 151.

Further, as illustrated in FIG. 6, an upper surface of the left roller 156 is inclined such that the height on the left end side becomes low. Accordingly, the leading end of the original document MS that has passed through the first reading position 400 is scooped up along the inclination of the left roller 156 and goes toward a nip region of the pair of reading outlet rollers 92.

The original document MS having passed through the first reading and conveying part E passes through the nip region of the pair of reading outlet rollers 92. Thereafter, the leading end of the original document MS is detected by a document ejection sensor 61, and the original document MS is further conveyed to the second reading and conveying part F. Then, after passing through the second reading and conveying part F, the original document MS is conveyed to the document ejecting part G.

In the case of performing the single side scanning mode to read a single surface (i.e., the first surface) of the original document MS, the second surface of the original document MS is not read by the second fixed scanning unit 95. Therefore, when the leading end of the original document MS is detected by the document ejection sensor 61, the document ejection motor 104 is started to drive and rotate in the normal direction, and the upper roller of a pair of document sheet ejection rollers 94 illustrated in FIG. 6 is driven and rotated in the counterclockwise direction in FIG. 6.

Further, a timing when the trailing end of the original document MS exits from the nip region of the pair of document sheet ejection rollers 94 is calculated based on a pulse count of the document ejection motor 104 from when the leading end of the original document MS is detected by the document ejection sensor 61. Then, based on the calculation result, the driving speed of the document ejection motor 104 is started to decrease at a timing immediately before the trailing end of the original document MS exits from a nip region of the pair of document sheet ejection rollers 94. With the control of this deceleration of the driving speed of the document ejection motor 104, the original document MS that has been discharged onto the document stacking table 55 is controlled to be ejected at a speed not to fly out of the document stacking table 55.

By contrast, in the case of performing the duplex scanning mode to read both surfaces (i.e., the first surface and the second surface) of the original document MS, the control of the original document MS is performed as follows. Specifically, a timing from when the leading end of the original document MS is detected by the document ejection sensor 61 to when the leading end of the original document MS has reached the second fixed scanning unit 95 is calculated based on the pulse count of the scan motor 103. Then, at the timing, a gate signal indicating an effective image area in the sub-scanning direction on the second surface of the original document MS is transmitted from the ADF controller 100 to the apparatus controller 111. Transmission of the gate signal is continuously performed until the trailing end of the original document MS exits from the second reading position in the second fixed scanning unit 95, and the second surface of the original document MS is read by the second fixed scanning unit 95.

The second fixed scanning unit 95 that functions as a reader includes a contact image sensor (CIS). Then, a coating process is applied to a reading surface of the second fixed scanning unit 95 with a view to preventing reading streaks due to adhering of a paste-like foreign substance from the original document MS to the reading surface of the second fixed scanning unit 95. Further, the second reader opposing roller 96 that functions as a document supporting body that supports the original document MS from a non-reading surface side (i.e., the first surface side) is arranged in a position facing the second fixed scanning unit 95 across the sheet feeding passage through which the original document MS passes. The second reader opposing roller 96 restrains floating up of the original document MS in the second reading position with respect to the second fixed scanning unit 95 and also has a role to function as a reference white portion for acquiring shading data in the second fixed scanning unit 95.

Further, in the present embodiment, the two fixed image reading devices 300 including the first fixed scanning unit 151 and the second fixed scanning unit 95 are included as document reading devices that read the image on the original document MS. A configuration to read images on both surfaces of the original document MS is not limited to the configuration including the two fixed image reading device 300. For example, this disclosure may also be applied to a configuration in which the original document MS is switched back after the first surface has been read by a single fixed image reading device 300 and the second surface is read when the original document MS passes through the reading position in the fixed image reading device 300.

The original document MS conveyed through the sheet feeding passage in the ADF 51 is moved while sliding with guide bodies that define the sheet feeding passage, and thus the sliding sound is generated. When such a sliding sound is transmitted outside an image forming apparatus, the sliding sound may become a noise that provides a feeling of discomfort to people around the image forming apparatus.

The ADF 51 of the present embodiment is provided with a sound absorber having a Helmholtz structure, and therefore a sliding sound generated as the original document MS is conveyed is absorbed.

Figure 9A:
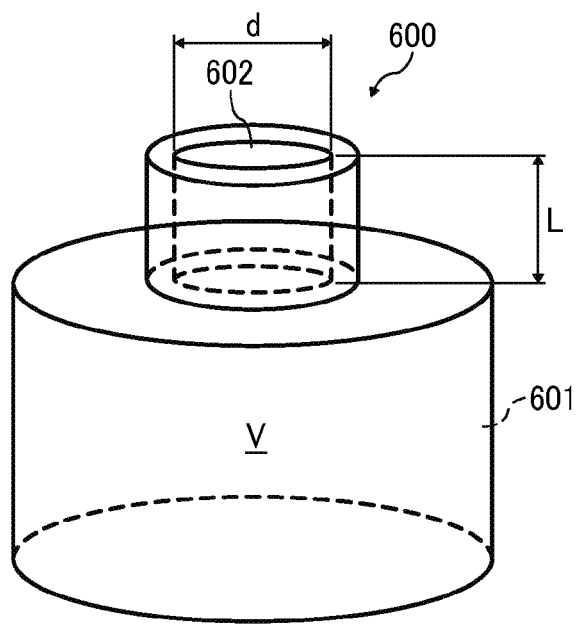
FIG. 9A is a diagram illustrating a sound absorber employing a Helmholtz resonator.
Figure 9B:
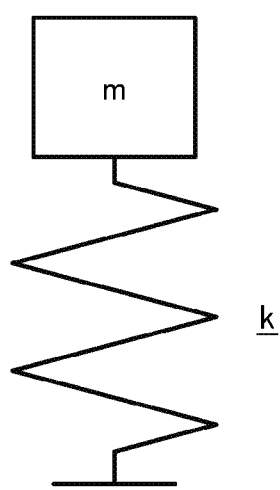
FIG. 9B is a diagram illustrating a spring system that performs simple harmonic oscillation in the sound absorber.

FIGS. 9A and 9B are diagrams of a sound absorber 600 employing a Helmholtz resonator structure. FIG. 9A is a schematic diagram of the sound absorber 600, and FIG. 9B is a schematic diagram of a spring system that performs simple harmonic oscillation.

As illustrated in FIG. 9A, the sound absorber 600 having a Helmholtz resonator structure has a shape like a container with a narrowed inlet, and is configured by a hollow portion 601 with a certain volume and a communication opening 602 that is smaller than the hollow portion 601. Then, the sound absorber 600 absorbs a sound having a specific frequency that enters into the communication opening 602.

When a sound wave from an outside enters the communication opening 602 of a structure in which the hollow portion 601 with a volume "V" illustrated in FIG. 9A is provided with the communication opening 602 with a diameter "d" and a length "L", the air in a portion of the communication opening 602 is integrally pushed into the hollow portion 601 by the sound wave. At that time, the pressure inside the sealed hollow portion 601 is increased, and acts to push back the pushed-in air in the communication opening 602. Even though the pushed back air in the communication opening 602 is pushed back to an outside of the hollow portion 601, the air tries to return by inertia. By repetition of this operation, the sound absorber 600 can be regarded as a spring system that performs simple harmonic oscillation with a mass "m" and a spring constant "k" illustrated in FIG. 9B. It is known that the resonant frequency of the Helmholtz resonator can be calculated by the following Equation (1).

$$f = \frac{C}{2\pi}\sqrt{\frac{S}{(L+\delta)V}} \quad (1)$$

where "f" represents a resonant frequency [Hz], "C" represents a sound speed [m/s], "S" represents a cross-sectional area of the communication opening 602 ($\pi/4 \cdot d^2$) [m$^2$], "L" represents a length of the communication opening 602 [m], "δ" represents a correction term by opening end [m], and "V" represents a volume of the cavity [m$^3$]).

In a case in which a plurality of communication openings 602 are arranged in a single hollow portion 601, similar calculation can be made by considering a sum up of the cross-sectional areas of the communication openings 602 as the cross-sectional area "S" of the plurality of communication openings 602.

The air in the communication opening 602 intensely vibrates at a frequency near the resonant frequency. However, a fluid (the air) receives resistance by viscosity in a boundary layer near a wall surface of the communication opening 602, energy of the vibration is converted into thermal energy due to viscous resistance. Energy of the sound by the entering sound wave is converted into the thermal energy by such a mechanism, so that the energy of the sound is decreased. Therefore, the sound absorber 600 having a Helmholtz resonator structure exhibits sound absorbing effects.

Figure 10A:
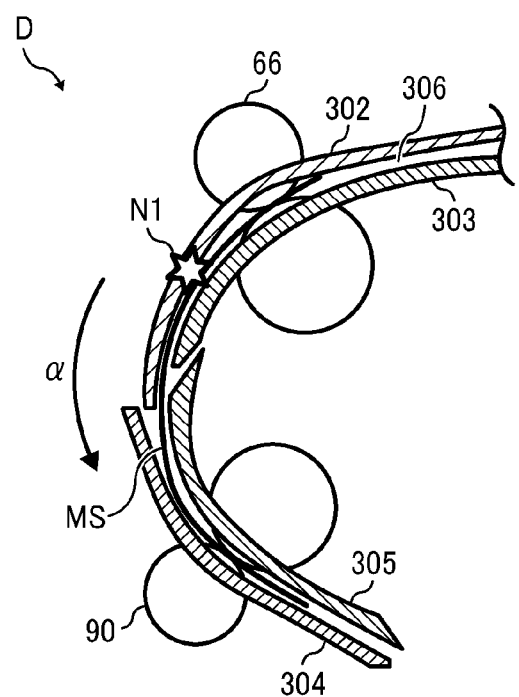
FIG. 10A is a diagram illustrating a sound occurring position in the turning part of the ADF.
Figure 10B:
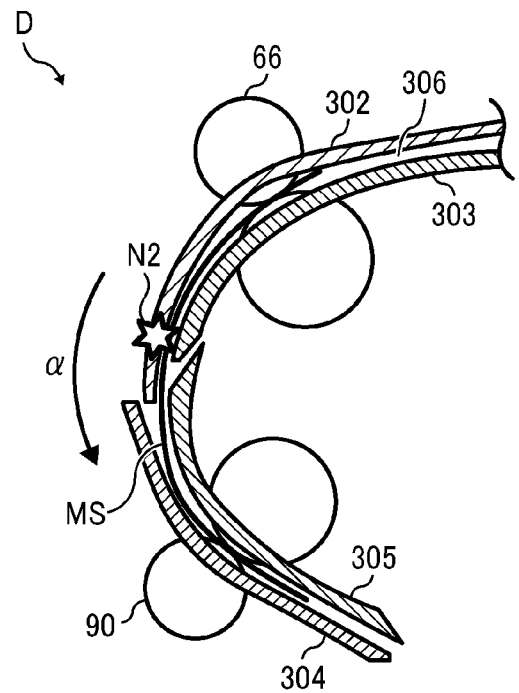
FIG. 10B is a diagram illustrating another sound occurring position in the turning part of the ADF.

FIGS. 10A and 10B are diagrams illustrating sound occurring positions of a sliding sound in the turning part D when the original document MS is fed and conveyed in the ADF 51. Arrow "α" indicated in FIGS. 10A and 10B indicates the document conveying direction of the original document MS in the turning part D. FIG. 10A is a diagram illustrating a state in which a sliding sound occurs from a first sliding position N1 that is close to the pair of intermediate rollers 66 between the pair of intermediate rollers 66 and the pair of reading inlet rollers 90. FIG. 10B is a diagram illustrating a state in which a sliding sound occurs from a second sliding position N2 that is downstream from the first sliding position N1 in the document conveying direction and upstream from the pair of reading inlet rollers 90 in the document conveying direction.

The original document MS passes through an original document conveying passage 306 that is defined by the guide bodies such as the guide plates in the ADF 51. As illustrated in FIGS. 10A and 10B, the original document conveying passage 306 in the turning part D is defined by an upstream outer guide plate 302, an upstream inner guide plate 303, a downstream outer guide plate 304, and a downstream inner guide plate 305.

The ADF 51 includes multiple pairs of rollers in the original document conveying passage 306. By rotating the multiple pairs of rollers, a recording sheet held between each one of the multiple pairs of rollers is fed out and conveyed to a further downstream one of the multiple pairs of rollers. The original document conveying passage 306 between the multiple pairs of rollers is defined by the guide plates (i.e., the upstream outer guide plate 302, the upstream inner guide plate 303, the downstream outer guide plate 304, and the downstream inner guide plate 305 in the present embodiment), along which the original document MS is guided to a further downstream pair of rollers.

In linear portions where the original document conveying passage 306 extends linearly, a force applied by the original document MS when slidably contacting the guide plates is small, and therefore the sliding sound is not significantly loud. By contrast, in curved portions where the original document conveying passage 306 is curved so as to change the document conveying direction, when the original document MS slidably contacts the guide plates, a large sliding sound is generated due to the sliding contact.

The original document MS to be conveyed in the ADF 51 has various paper types covering thin paper, thick paper coated sheet, overhead projector (OHP) film, and the like. Since these paper types have various property values such as thickness and rigidity different from each other, a course through which the original document MS passes in the original document conveying passage 306 changes. Consequently, a position at which the guide plates and the original document MS slidably contact with each other in the document conveying direction of the original document MS also changes. For example, in a case in which the original document MS is a paper type that is rigid and hard to bend such as a thick paper, as illustrated in FIG. 10A, the original document MS slides on the upstream outer guide plate 302 at the first sliding position N1, resulting in occurrence of the sliding sound. By contrast, in a case in which the original document MS is a paper type that is easy to bend such as a thin paper, as illustrated in FIG. 10B, the original document MS slides on the upstream outer guide plate 302 at the second sliding position N2 that is located downstream from the first sliding position N1 in the document conveying direction, and the sliding sound is generated.

Therefore, for example, if a sound absorber is located at a position where the sliding sound is generated when a thick paper is conveyed (i.e., the first sliding position N1), the sound absorber is effective during conveyance of a thick paper. However, since the position where the sliding sound is generated is changed to a further downstream side of the document conveying direction of the original document MS during conveyance of a thin paper, the sound absorber cannot absorb the sliding sound so effectively as when a thick paper is conveyed.

For example, a comparative sound absorber is configured to change an opening area according to the thickness and weight of a recording sheet to be conveyed. By so doing, the shape of the resonator type sound absorbing structure is changed, thereby changing a frequency having a high sound absorbing effect. However, in a case in which a sheet conveying passage is changed according to different property values of the recording sheet to be conveyed and a sound source position at which a sliding sound is generated changes in the sheet conveying direction of the recording sheet, it is difficult to absorb the sound at an appropriate position, and therefore the inconvenience that the sound absorbing effect is degraded cannot be restrained.

In order to address the above-described inconvenience, the ADF 51 according to the present embodiment of this disclosure includes the sound absorber 600 provided to the turning part D.

FIG. 1 is a diagram illustrating the turning part D of the ADF 51, with the sound absorber 600 disposed at the turning part D.

The turning part D of the ADF 51 includes the upstream inner guide plate 303 and the upstream outer guide plate 302. The upstream inner guide plate 303 functions as a first sheet guide body to guide the original document MS to a predetermined direction. The upstream outer guide plate 302 functions as a second sheet guide body and is disposed facing the upstream inner guide plate 303.

The upstream outer guide plate 302 includes a document conveying direction changer that slides with the original document MS when the original document MS is conveyed in a horizontal direction and causes the original document MS to bend and change the document conveying direction downwardly. The conveyance direction changer includes the first sliding position N1 and the second sliding position N2.

The upstream outer guide plate 302 includes the hollow portion 601 and the communication opening 602. The hollow portion 601 includes at least one cavity. The communication opening 602 includes at least one communication portion to cause the hollow portion 601 and the original document conveying passage 306 to communicate with each other.

As illustrated in FIG. 1, the upstream outer guide plate 302 is one of the guide plates that define the original document conveying passage 306 at the turning part D. The upstream outer guide plate 302 includes a fixed guide plate 302a and a movable guide plate 302b. The fixed guide plate 302a has the hollow portion 601 formed on a back side that is opposite to a side facing the original document conveying passage 306 and is disposed at a fixed position, and therefore is not movable relative to the original document conveying passage 306. The movable guide plate 302b has the communication opening 602 through which the hollow portion 601 formed on the fixed guide plate 302a and the original document conveying passage 306 communicate with each other. The movable guide plate 302b is movable relative to the original document conveying passage 306 in a direction indicated by arrow β in FIG. 1. The hollow portion 601 and the communication opening 602 configures the sound absorber 600 having a resonator type sound absorbing structure.

The resonator type sound absorbing structure is most effective to have the communication opening 602 near a sound source. Therefore, in a case in which a sliding sound generated by sliding between the original document MS that functions as a sheet and the guide plates is absorbed, it is preferable to form the communication opening 602 near the sound source of the sliding sound.

As illustrated in FIG. 1, the ADF 51 according to the present embodiment of this disclosure is an example having the sound absorber 600 of a resonator type sound absorbing structure in the turning part D where the sliding sound can easily occur. Specifically, the communication opening 602 is provided in the turning part D.

The upstream outer guide plate 302 rotates the movable guide plate 302b relative to the fixed guide plate 302a in the direction β in FIG. 1. This rotation changes a position of the communication opening 602 provided to the movable guide plate 302b in the original document conveying passage 306 to the document conveying direction of the original document MS.

According to this configuration, even when the paper type of the original document MS to be conveyed is changed and therefore a sound occurring position of the sliding sound is changed, the position of the communication opening 602 is changed according to the sound occurring position, and the sliding sound can be absorbed at an optimal position relative to the original document MS. Accordingly, a good sound absorbing performance can be obtained effectively.

Figure 11A:
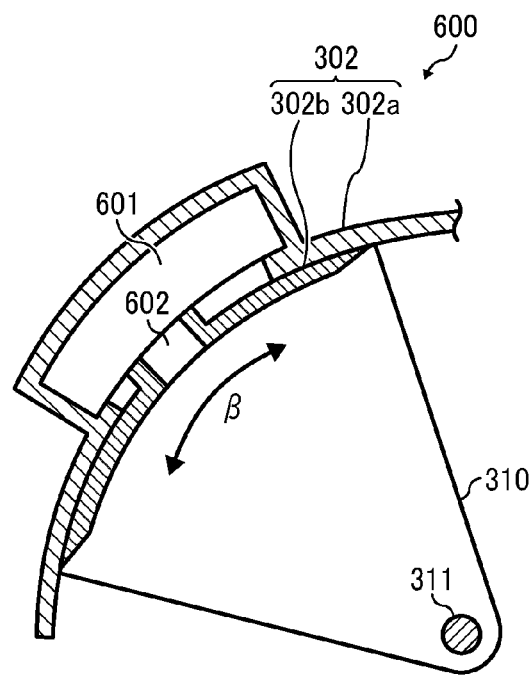
FIG. 11A is a diagram illustrating a rotary mechanism of a movable guide plate when a communication opening is disposed at a position.
Figure 11B:
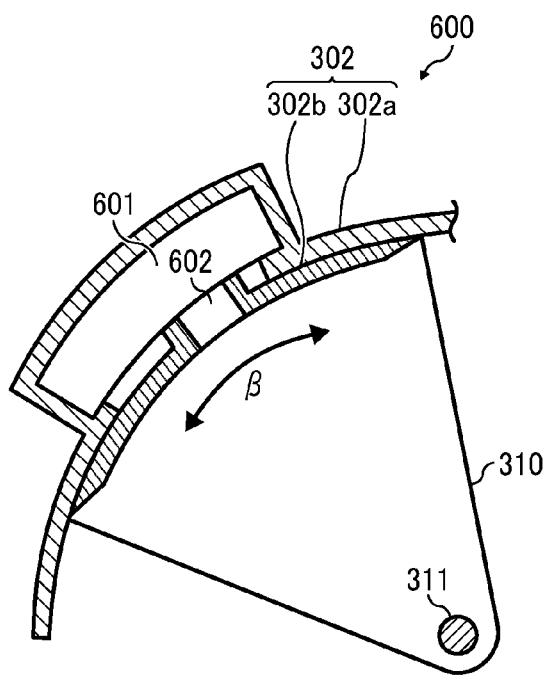
FIG. 11B is a diagram illustrating a rotary mechanism of a movable guide plate when the communication opening is disposed at another position.

FIGS. 11A and 11B are diagram illustrating a rotary mechanism of the movable guide plate 302b. FIG. 11A is a diagram illustrating the rotary mechanism of the movable guide plate 302b when the communication opening 602 is disposed at a position on a downstream side in the document conveying direction. FIG. 11B is a diagram illustrating the rotary mechanism of the movable guide plate 302b when the communication opening 602 is disposed upstream from the communication opening 602 of FIG. 11A in the document conveying direction.

As illustrated in FIGS. 11A and 11B, the movable guide plate 302b is fixed to a movable guide support 310. The movable guide support 310 is rotatably supported by a rotary guide shaft 311. By rotating the movable guide support 310 about the rotary guide shaft 311, the movable guide plate 302b that is fixed to the movable guide support 310 rotates in the direction β in FIGS. 11A and 11B.

When the number of paper types of the original document MS to be conveyed is small or when the sound occurring position (the sound source position) does not shift substantially, it is sufficient that the position of the communication opening 602 is changed between two locations. In this case, the manufacturing cost of the configuration can be reduced, for example, by using a solenoid to drive the movable guide plate 302b.

Figure 12:
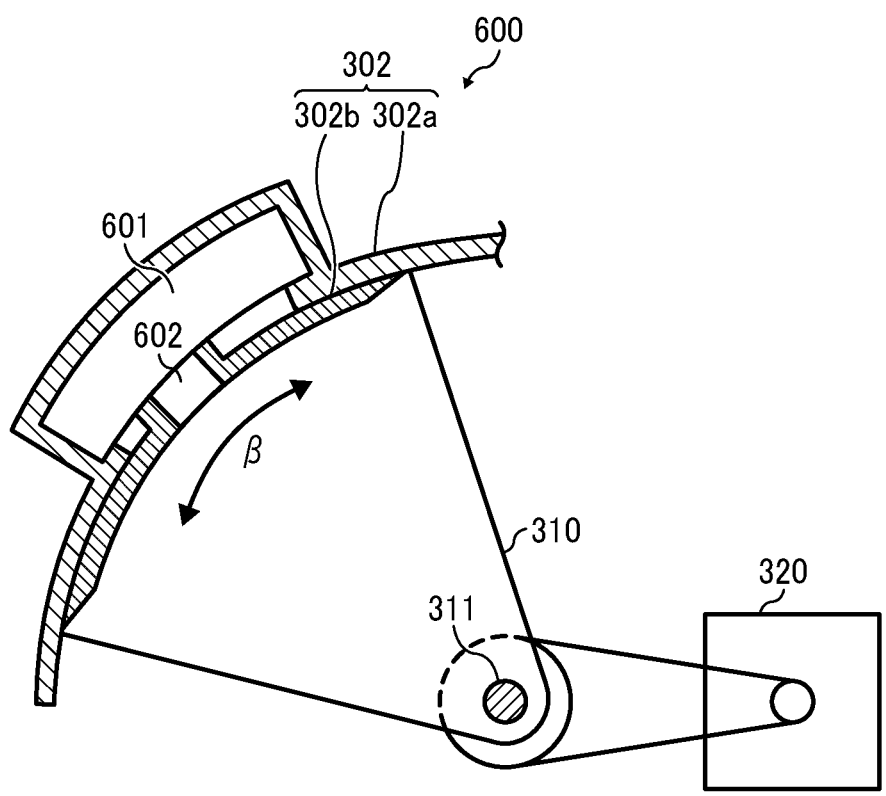
FIG. 12 is a diagram illustrating a movable guide plate drive motor provided to rotate the movable guide plate.

FIG. 12 is a diagram illustrating a movable guide plate drive motor 320 that functions as a drive source provided to rotate the movable guide plate 302b.

In a case in which the number of paper types of the original document MS to be conveyed is large and the communication opening 602 is expected to change to multiple positions, it is preferable to use a drive source such as the movable guide plate drive motor 320 to drive the movable guide plate 302b. By so doing, the position of the communication opening 602 can be controlled more accurately with substantially no steps.

Further, the ADF 51 including the drive source can move the movable guide plate 302b automatically, and therefore the operability of the ADF 51 can be enhanced.

When the drive source such as the solenoid and the movable guide plate drive motor 320 drives to move the movable guide plate 302b, the ADF controller 100 controls the drive source based on the paper type inputted via the instruction input unit 108 such that the position of the communication opening 602 corresponds to a position appropriate to the inputted paper type.

The configuration to move the movable guide plate 302h is not limited to the configuration having a drive source. For example, a configuration in which the movable guide plate 302h is moved manually can be applied to this disclosure.

It is also applicable that a document thickness detector to detect the thickness of the original document MS is disposed upstream from the position of the communication opening 602 in the original document conveying passage 306 in the document conveying direction of the original document MS. Then, the ADF controller 100 controls driving of the drive source based on the detection result of the document thickness detector such that the position of the communication opening 602 corresponds to a position appropriate to the detected thickness of the original document MS.

The configuration of the document thickness detector may include a shaft interval measuring device 87 to measure a distance between respective shafts of two rollers of the pair of pullout rollers 86. In this configuration, the distance between respective shafts of two rollers of the pair of pullout rollers 86 is measured while the original document MS is held between the pair of pullout rollers 86. By so doing, the thickness of the original document MS can be detected.

The document conveying and reading device 50 according to the present embodiment of this disclosure includes the ADF 51 having the above-described configuration. Accordingly, the sliding sound that is generated by the original document MS and the guide bodies such as the guide plates can be restrained from being leaked to the outside of the document conveying and reading device 50.

Further, the image forming apparatus 500 according to the present embodiment of this disclosure includes the above-described document conveying and reading device 50. Consequently, the sliding sound generated by the original document MS and the guide bodies such as the guide plates can be restrained from being leaked to the outside of the image forming apparatus 500.

In the above-described embodiment(s), even if the sound occurring position of a target sound to be absorbed by the sound absorber 600 is changed in the document conveying direction of the original document MS, the communication opening 602 is changed in the document conveying direction of the original document MS, so that the target sound can be absorbed efficiently. The direction to move the communication opening 602 is not limited to the document conveying direction of the original document MS. For example, a direction perpendicular to the document conveying direction of the original document MS can be applied to the direction to move the communication opening 602. In this configuration, even if the sound occurring position of a target sound to be absorbed by the sound absorber 600 is changed, for some reasons, to the direction perpendicular to the document conveying direction of the original document MS, the target sound can be absorbed efficiently.

In the above-described embodiment(s) of this disclosure, a sheet conveying device that includes a sound absorber provided to a sheet conveying passage is an automatic document feeder (i.e., the ADF 51) that functions as a document feeder to feed and convey an original document. However, the sheet conveying device having a sound absorber in the sheet conveying passage is not limited to the ADF. For example, this disclosure can be applicable to the sheet feeding device 40 to feed a recording sheet accommodated in either one of the sheet trays 42 toward the image forming device 1. When the sheet conveying device corresponds to the sheet feeding device 40, the sheet conveying device includes a sound absorber provided with a hollow portion and a communication portion to guide body (for example, the multiple pairs of conveying rollers 46) defining the sheet feeding passage 44. Then, the communication portion is disposed movable in a sheet conveying direction, relative to the sheet feeding passage 44. By so doing, the sliding sound generated between the recording sheet and the guide bodies such as the guide plates during sheet conveyance of the recording sheet can be prevented from leaking to the outside of the image forming apparatus 500.

The configurations according to the above-described embodiments are not limited thereto. This disclosure can achieve the following aspects effectively.

Aspect A.

A sheet conveying device (for example, the ADF 51 and the sheet feeding device 40) includes a passage forming body (for example, the upstream outer guide plate 302) and a sound absorber (for example, the sound absorber 600). The passage forming body is configured to define a sheet conveying passage (for example, the original document conveying passage 306) through which a sheet (for example, the original document MS and the recording sheet P) passes. The sound absorber includes a hollow portion (for example, the hollowing portion 601) and a communication portion (for example, the communication opening 602) configured to communication the hollow portion and the sheet conveying passage. A position of the communication portion of the sound absorber is changeable in the sheet conveying passage.

According to this configuration, as described in the above-embodiments, even if the sound occurring position of a target sound generated during sheet conveyance of the sheet is changed in the document conveying direction of the sheet, the position of the communication portion can be moved to match the sound occurring position of the target sound, and therefore the target sound can be absorbed at an optimal position. Accordingly, the target sound generated during sheet conveyance of the sheet can be prevented from leaking to the outside of the sheet conveying device efficiently.

Aspect B.

In Aspect A, the passage forming body (for example, the upstream outer guide plate 302) includes a fixed body (for example, the fixed guide plate 302a) and a movable body (for example, the movable guide plate 302b). The fixed body is disposed at a fixed position and has a cavity. The movable body is movable relative to the fixed body and has an opening through which the cavity and the sheet conveying passage communicate with each other.

According to this configuration, as described in the above-embodiments, the cavity formed on the fixed body and the opening formed in the movable body configure the sound absorber (for example, the sound absorber 600) that includes the hollow portion and the communication portion. Accordingly, by moving the movable body, the communication portion, that is, the opening, in the sheet conveying passage can be moved to change the position of the communication portion.

Aspect C.

In Aspect B, the sheet conveying device for example, the ADF 51 and the sheet feeding device 40) includes a movable body drive source (for example, the movable guide plate drive source 320) configured to move the movable body (for example, the movable guide plate 302b) of the passage forming body (for example, the upstream outer guide plate 302) to the fixed body (for example, the fixed guide plate 302a) of the passage forming body.

According to this configuration, as described in the embodiments above, the movable body of the passage forming body can be moved automatically, and therefore the operability of the sheet conveying device can be enhanced.

Aspect D.

In any one of Aspect A through Aspect C, the communication portion (for example, the communication opening 602) is provided in a curved portion in the sheet conveying passage (for example, the original document conveying passage 306).

According to this configuration, as described in the embodiments, by disposing the communication portion in the curved portion where the sliding sound can easily occur, the sliding sound can be absorbed efficiently. Further, the sound occurring position of the sliding sound generated by the sheet (for example, the original document MS) and the passage forming body (for example, the upstream outer guide plate 302) due to the property value of the sheet is easily varied in the curved portion. However, the position of the communication portion can be moved to change the position of the communication portion. Accordingly, sliding sound can be absorbed efficiently.

Aspect E.

In any one of Aspect A through Aspect D, the position of the communication portion (for example, the communication opening 602) in the sheet conveying passage (for example, the original document conveying passage 306) is changeable according to a type of the sheet being conveyed.

According to this configuration, as described in the embodiments, even if the sound occurring position of the sliding sound is changed based on the change of the paper type of the sheet, the position of the communication portion can be changed according to the change of the sound occurring position. Accordingly, the sound absorbing performance can be enhanced effectively.

Aspect F.

In any one of Aspect A through Aspect E, the sheet conveying device (for example, the ADF 51 and the sheet feeding device 40) further includes a sheet thickness detector (for example, the sheet thickness detecting device and a shaft interval measuring device (for example, the shaft interval measuring device 87) of the pair of pullout rollers 86) configured to detect a thickness of the sheet (for example, the original document MS and the recording sheet P) to be conveyed. The position of the communication portion (for example, the communication opening 602) in the sheet conveying passage (for example, the original document conveying passage 306) is changed based on a result detected by the sheet thickness detector.

According to this configuration, as described in the embodiments, even if the sound occurring position of the sliding sound is changed based on the change of the thickness of the sheet, the position of the communication portion can be changed according to the change of the sound occurring position. Accordingly, the sound absorbing performance can be enhanced effectively.

Further, based on the result detected by the sheet thickness detector, the movable body (for example, the movable guide plate 302b) is changed by the movable body drive source (for example, the, movable guide plate drive motor 320). With this configuration, the position of the communication portion in the sheet conveying passage can be changed according to the thickness of the sheet. Accordingly, the sound absorbing performance can be enhanced effectively.

Aspect G.

An image reading device (for example, the original document conveying and reading device 50) includes the sheet conveying device (for example, the ADF 51) according to any one of Aspect A through Aspect F and a sheet reader (for example, the scanner 150). The sheet conveying device includes an original document conveying device (for example, the ADF 51) configured to convey an original document (for example, the original document MS) having an image on a surface thereof. The sheet reader is configured to read the image formed on the original document conveyed by the original document conveying device.

According to this configuration, as described in the embodiments, a sound (for example, the sliding sound) which is generated by the original document and the passage forming body (for example, the upstream outer guide plate 302) during the sheet conveyance of the original document can be restrained from being leaked to the outside of the image reading device.

Aspect H.

An image forming apparatus (for example, the image forming apparatus 500) includes the image reading device (for example, the original document conveying and reading device 50) according to Aspect G and an image forming device (for example, the image forming device 1) configured to form a print image based on the image formed on the original document (for example, the original document MS) read by the image reading device.

According to this configuration, as described in the embodiments, a sound (for example, the sliding sound) which is generated by the original document and the passage forming body (for example, the upstream outer guide plate 302) during the sheet conveyance of the original document can be restrained from being leaked to the outside of an image forming apparatus (for example, the image forming apparatus 500).

Aspect I.

An image forming apparatus (for example, the image forming apparatus 500) includes an image forming device (for example, the image forming device 1) configured to form a print image on a recording medium (for example, the recording sheet P) and the sheet conveying device (for example, the sheet feeding device 40) according to any one of Aspect A through Aspect F. The sheet conveying device includes a recording medium conveying device (for example, the sheet feeding device 40) configured to convey the recording medium accommodated in a recording medium container (for example, the recording medium container 42) to the image forming device.

According to this configuration, as described in the embodiments, a sound (for example, the sliding sound) which is generated by the recording medium and the passage forming body (for example, the multiple pairs of conveying rollers 46) during the sheet conveyance of the recording medium can be restrained from being leaked to the outside of an image forming apparatus.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. A sheet conveying device comprising:
a passage forming body, configured to define a sheet conveying passage through which a sheet is to pass, the passage forming body including:
   a fixed body disposed at a fixed position and including a cavity, and
   a movable body, movable relative to the fixed body, including an opening through which the cavity and the sheet conveying passage are configured to communicate, the cavity formed on the fixed body and the opening formed in the movable body configuring a sound absorber, the sound absorber including a hollow portion and a communication portion, configured to communicate the hollow portion and the sheet conveying passage, and a position of the communication portion of the sound absorber being changeable by the movable body within the sheet conveying passage.

2. The sheet conveying device of claim 1, further comprising a movable body drive source, configured to move the movable body of the passage forming body to the fixed body of the passage forming body.

3. The sheet conveying device of claim 1, wherein the communication portion is provided in a relatively curved portion in the sheet conveying passage.

4. The sheet conveying device of claim 1, wherein the position of the communication portion in the sheet conveying passage is changeable based upon a type of the sheet, input via an input unit, to be conveyed.

5. The sheet conveying device of claim 1, further comprising a sheet thickness detector, configured to detect a thickness of the sheet to be conveyed, wherein the position of the communication portion in the sheet conveying passage is changeable based on a result detected by the sheet thickness detector.

6. An image reading device comprising:
the sheet conveying device of claim 1, including an original document conveying device configured to convey an original document including an image on a surface of the original document; and
a sheet reader, configured to read the image included on the original document conveyed by the original document conveying device.

7. An image forming apparatus comprising:
the image reading device of claim 6; and
an image forming device, configured to form a print image based on the image included on the original document and read by the image reading device.

8. An image forming apparatus comprising:
an image forming device configured to form a print image on a recording medium; and
the sheet conveying device of claim 1, including a recording medium conveying device configured to convey the recording medium, accommodated in a recording medium container, to the image forming device.

9. The sheet conveying device of claim 1, wherein the sound absorber is a Helmholtz resonator.

10. An image reading device comprising:
the sheet conveying device of claim 1, wherein the sound absorber is a Helmholtz resonator, including an original document conveying device configured to convey an original document including an image on a surface of the original document; and
a sheet reader, configured to read the image included on the original document conveyed by the original document conveying device.

11. An image forming apparatus comprising:
the image reading device of claim 10; and
an image forming device, configured to form a print image based on the image included on the original document and read by the image reading device.

12. An image forming apparatus comprising:
an image forming device configured to form a print image on a recording medium; and
the sheet conveying device of claim 1, wherein the sound absorber is a Helmholtz resonator, including a recording medium conveying device configured to convey the recording medium, accommodated in a recording medium container, to the image forming device.

* * * * *